US009109721B1

(12) United States Patent
Williams et al.

(10) Patent No.: US 9,109,721 B1
(45) Date of Patent: Aug. 18, 2015

(54) APPARATUS FOR FILTERING AND/OR CONDITIONING AND/OR PURIFYING A FLUID SUCH AS WATER, AND INTERFACE THEREOF FOR PROVIDING WATER BOILER EXPANSION PRESSURE RELIEF

(75) Inventors: Richard T. Williams, Glenmoore, PA (US); Carl Beiswenger, Pottstown, PA (US)

(73) Assignee: GENERAL ECOLOGY, INC., Exton, PA (US)

( * ) Notice: Subject to any disclaimer, the term of this patent is extended or adjusted under 35 U.S.C. 154(b) by 0 days.

(21) Appl. No.: 13/618,731

(22) Filed: Sep. 14, 2012

(51) Int. Cl.
*B01D 21/20* (2006.01)
*B01D 35/18* (2006.01)
*E03B 1/00* (2006.01)
*F16K 51/00* (2006.01)
*B01D 35/147* (2006.01)
*B01D 24/38* (2006.01)
*C02F 1/00* (2006.01)
*E03B 7/07* (2006.01)

(52) U.S. Cl.
CPC ............. *F16K 51/00* (2013.01); *B01D 24/38* (2013.01); *B01D 35/147* (2013.01); *B01D 2201/04* (2013.01); *B01D 2201/167* (2013.01); *C02F 1/001* (2013.01); *C02F 2301/02* (2013.01); *E03B 7/078* (2013.01)

(58) Field of Classification Search
None
See application file for complete search history.

(56) References Cited

U.S. PATENT DOCUMENTS

| 3,589,673 | A | * | 6/1971 | Cruse ........................ 251/149.1 |
| 4,045,293 | A | * | 8/1977 | Cooksley ........................ 203/10 |
| 2004/0190367 | A1 | * | 9/2004 | Wierzbicki et al. ........... 366/140 |
| 2007/0215531 | A1 | * | 9/2007 | Wawrla et al. ................. 210/101 |

* cited by examiner

*Primary Examiner* — Nam Nguyen
*Assistant Examiner* — Richard Gurtowski
(74) *Attorney, Agent, or Firm* — John F. A. Earley, III; Frank J. Bonini, Jr.; Harding, Earley, Follmer & Frailey, P.C.

(57) ABSTRACT

An apparatus for filtering water has an interface and a filtration/purification canister removably mountable onto the interface. Connecting the canister to the interface automatically opens a check valve in the interface to permit water to flow from the interface into and through the canister, and then back to and through the interface to an outlet port. Disconnecting the canister from the interface automatically closes the check valve, stopping the flow of water. The interface provides for water boiler expansion pressure relief, while guarding against any water contaminated downstream of the apparatus from backflowing into the filtration/purification canister and contaminating the portion of the filtration/purification canister downstream of the filter/conditioning/purifying medium held within the filtration/purification canister and thereby causing water exiting the outlet port of the filtration/purification canister to be contaminated.

10 Claims, 17 Drawing Sheets

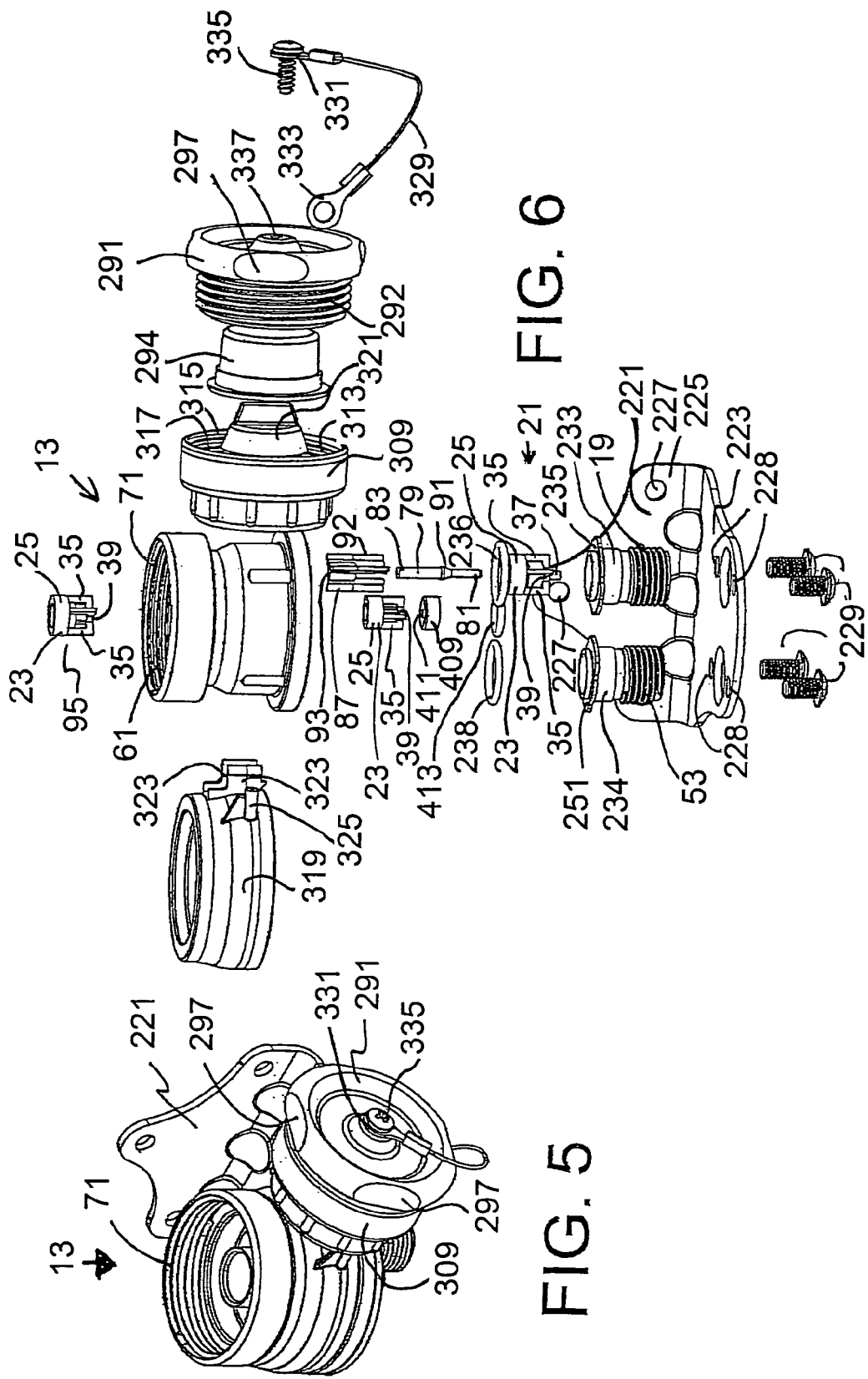

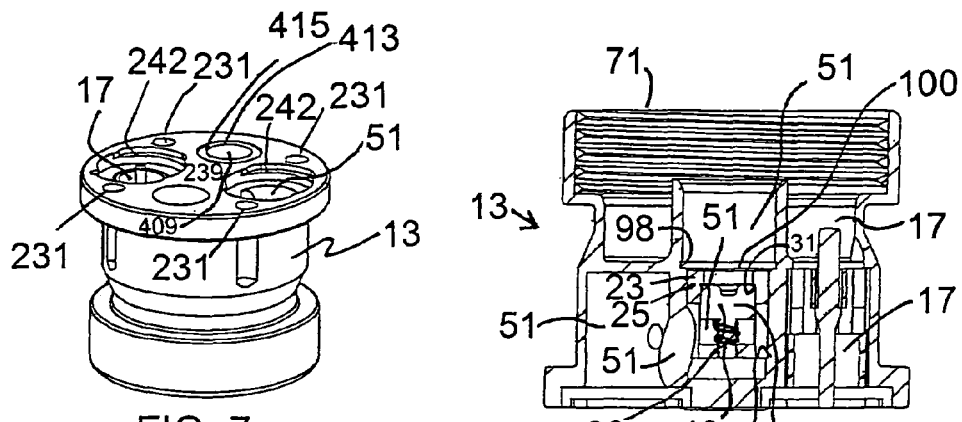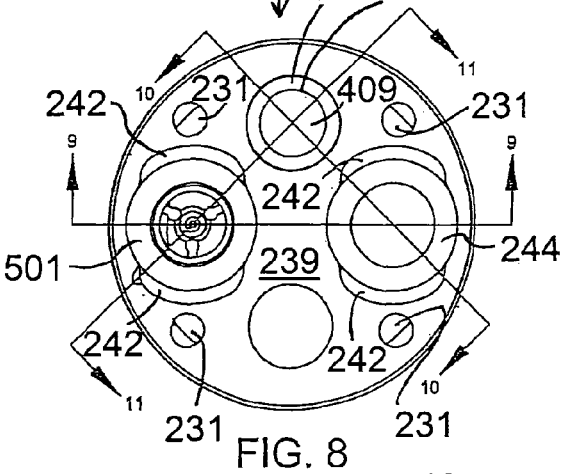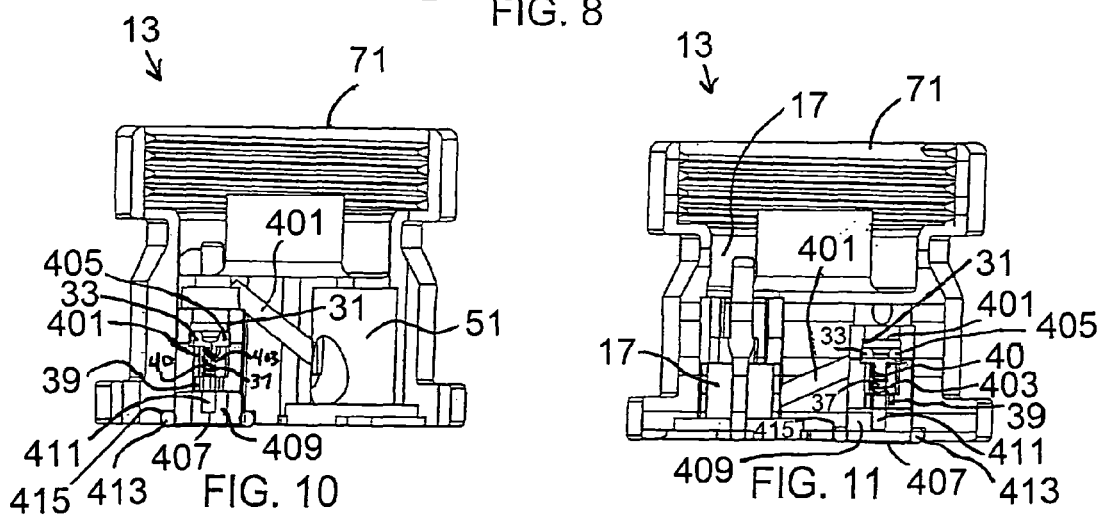

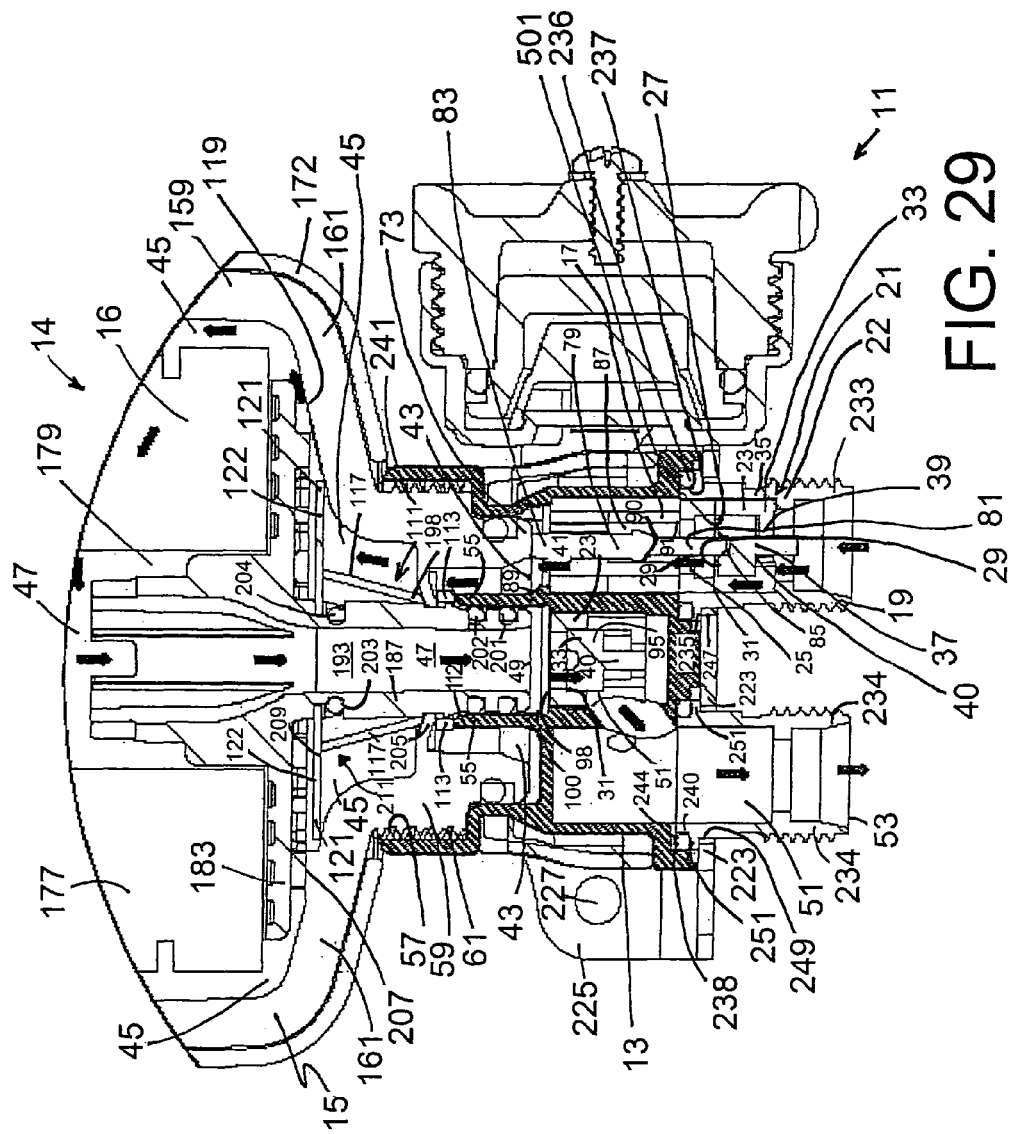

APPARATUS FOR FILTERING AND/OR CONDITIONING AND/OR PURIFYING A FLUID SUCH AS WATER, AND INTERFACE THEREOF FOR PROVIDING WATER BOILER EXPANSION PRESSURE RELIEF

FIELD OF THE INVENTION

This invention relates to apparatuses for filtering and/or conditioning and/or purifying a fluid such as water, and more particularly concerns such apparatuses that use a pressure vessel holding a cartridge, loose media, or the like for filtering and/or conditioning and/or purifying a fluid such as water which are used in potable water distribution systems, such as potable water distribution systems for aircraft.

BACKGROUND OF THE INVENTION

Adequate hydration is particularly important for comfortable air travel, especially aboard modern, very large, long range aircraft capable of flights of 20 or more hours duration. Typically, water is distributed to galleys, lavatories, and drinking water outlets of the aircraft to provide drinking water to passengers, to provide water for food and beverage preparation, and to provide water for personal hygiene (e.g., face and hand rinsing, teeth cleaning, etc.) during flights. Aircraft typically are crowded with thousands of passengers including babies, small children, handicapped people, possibly ill people, and others, from varied backgrounds, passing through a commercial passenger aircraft during a single week. Both passengers and crews contribute to microorganism populations aboard aircraft, and special precautions must be taken to minimize and avoid the possibility of bacteria, viruses, pathogenic cysts, and other microorganisms being transferred among passengers through the water distribution system. Further, water is supplied to aircraft from many locations and varies widely in taste and sanitary quality. In addition to point-of-use effective on-board drinking water microfilters/purifiers, a primary sanitation defense mechanism against bacteria and viruses is to maintain an adequate residual of chlorine, preferably free chlorine, within the water storage and distribution systems. Further, effective on-board point-of-use drinking water microfilters/purifiers reliably remove parasitic cysts (leading causes of water borne disease worldwide) such as Giradia and Crypto which are not controlled by chlorination.

Typically, a water distribution system on aircraft comprises a water storage tank supplying a centralized distribution line with various branches or legs extending from the central distribution line to locations throughout the aircraft. For example, water is distributed via the water distribution system to galleys, lavatories, and other locations as needed for food and beverage preparation, and for personal hygiene during flights. Galleys include many "service points" such as coffee makers, water boilers, and drinking water outlets. Similarly, lavatories often include drinking water outlets and may be used for face and hand rinsing, cleaning teeth and short term personal medication. There are many possible opportunities for aircraft drinking water systems/supplies to become contaminated with microorganisms even if hygienically safe when loaded aboard an aircraft.

Typically, water filter/purifier units, each comprising a housing pressure vessel and a filtration/purification cartridge, are installed in or near galleys and lavatories as part of the aircraft water distribution system to improve water quality for consumption and for food and beverage preparation. Purifiers (water filter/purifiers having a purification element) must be independently certified to meet the EPA Guide Standard Protocol for Microbiological Purifiers relative to bacteria, viruses and cysts. Structured Matrix™ purifiers, sold by General Ecology, Inc., also provide excellent filtration. Filters, such as General Ecology, Inc.'s Structured Matrix™ microfilters or simple, fine, or coarse carbon and/or sediment systems, may be sophisticated, but such filters cannot legally be referred to as microbiological purifiers before being verified that they meet the EPA Guide Standard Protocol for Microbiological Purifiers. Space in galley and lavatory compartments is expensive and severely limited. Accordingly, water filter/purifier units usually are installed in "out of the way", often difficult to access locations often behind other more readily accessible equipment and bulkheads.

Possible microorganisms of concern are pathogenic bacteria, cysts and viruses. Chlorine resistant pathogenic cysts such as Crypto require special consideration and protective measures, such as providing point-of-use water filter/purifier units (e.g., water purifiers along the aircraft water distribution system to remove pathogenic cysts from the water moving through them). Such water filter/purifier units also remove bacteria, viruses, and other microorganisms from the water moving through them. Further, to overcome the challenges of virus and bacteria transmission via water systems and colonization within the aircraft potable water distribution systems, airlines often try to assure an adequate chlorine residual within the aircraft water supply. Even so, it is necessary to periodically "sanitize" the aircraft water distribution system, typically with a 2+ hours soak of high concentration (100 ppm) chlorine solutions. The sanitation process requires time and labor intensive removal of filtration/purification cartridges from the water filter/purifier units installed in galleys, fountains, and lavatories throughout the aircraft prior to the sanitation process. After removal of cartridges, pressure vessels must be reassembled to allow complete distribution of the sanitizing solution through the water distribution system and to prevent leakage of this highly corrosive and oxidizing sanitizing solution during the two hours sanitization soak.

Cartridge removal is required for at least two reasons: 1) because a high concentration of chlorine is detrimental to most filtration/purification cartridges, and 2) more importantly, because microorganisms might be sheltered in crevices and imperfections at sealing surface interfaces (ideal locations for biofilm formation) of the water filter/purifier units compromising effectiveness of the sanitizing process, thereby allowing recolonization of the distribution system. Even though sanitization is recognized as effective, typically because of the relatively high cost of the sanitizing process and the revenue lost due to the downtime of the aircraft during the sanitizing process, sanitization is performed infrequently—possibly every six months or at a convenient "A Check" or more extensive maintenance intervals when other maintenance is carried out.

After chlorine flushing and soaking for two hours, following current practices, the pressure vessels once again are opened and the same cartridges (or new replacement cartridges) are installed. Potable water is flushed throughout the aircraft water distribution system to thoroughly remove the extremely high concentration sanitizing solutions. Several hours may be required to sanitize an aircraft resulting in costs averaging upwards to hundreds of dollars per unit. More efficient, lower cost sanitization would allow more frequent sanitization and provide possibly higher quality potable water with better economy.

Water must be drained from aircraft during periods of non-use (such as overnight) in cold climates. Proposed EPA regulations require much more frequent draining and filling of water storage tanks in an effort to improve aircraft drinking water quality and safety. Draining and filling water systems requires "vacuum breaks" at equipment locations to allow water to be properly released and "vents" to allow air to escape in order to assure proper functioning of filters, purifiers, and other equipment. Although the very latest filter/purifier units include automatic vacuum breaks and venting, most aircraft units require manual actuation often resulting in inadequate water draining and filling.

Also, under the proposed EPA regulations, it is likely that accessing and actuating manual vents and vacuum breaks, sometimes previously ignored, may become a significantly higher maintenance cost item due to difficult access to the water filter/purifier units and aircraft "out of service" revenue costs.

Even with periodic sanitization, bacteria may colonize various branches (legs) of water distribution systems. Bacteria multiply rapidly, sometimes doubling in number in approximately 16 minutes. Therefore, a small number of bacteria may quickly reach infectious concentrations in water intended to be consumed, especially downstream of improperly installed/serviced filters/purifiers employed to remove chlorine, foul tastes, and odors. Further, water filter/purifier units installed in semi-remote locations along the water distribution system often require longer than desired distribution lines to specific service points (e.g., locations where the water is discharged from the water distribution system). These distribution lines provide unnecessary opportunities for previously purified water to be recontaminated from inadvertent inoculation, short term bacteria multiplication or biofilm formation/shedding that may have taken place in such distribution lines downstream of the water filter/purifier units.

Water boilers are typically provided along the water distribution lines of a potable water distribution system for aircraft, and are provided typically along the water distribution lines downstream of water filter/purifier units of the potable water distribution system typically at or near galleys to provide hot water for use preparing beverages like coffee and tea. If water boiler expansion pressure builds up to a dangerous level due to a water boiler overheating, and protection against backflow of water through the water filter/purifier units is provided, the water boiler expansion pressure created by the water boiler overheating creates a risk of extremely hot water blowing back along the water distribution lines between the water boiler and a water filter/purifier unit, with the pressure being released by opening a faucet, such as a cold water faucet, positioned along the water distribution lines between the water boiler and the water filter/purifier unit upstream of the water boiler, resulting in the person that opened the faucet being injured by scalding hot water.

Removing the backflow protection to provide some water boiler expansion pressure relief in the potable water distribution system creates a risk that the structure of the filtration/conditioning/purification medium (e.g., a filtration/conditioning/purification cartridge) of a water filter/purifier unit may be damaged if exposed to such water boiler expansion pressure. Moreover, removing the backflow protection creates a risk that water contaminated downstream of the water filter/purifier unit may backflow into the water filter/purifier unit and contaminate the portion of the water filter/purifier unit downstream of the filtering/conditioning/purifying medium of the water filter/purifier unit, thereby causing water exiting the outlet port of the filter/purifier unit to be contaminated, which would create a health risk to passengers from bacteria, viruses, and the like being transferred from contaminated water from the water distribution system.

SUMMARY OF THE INVENTION

It is an object of the invention to provide an apparatus, and an interface thereof, for filtering and/or conditioning and/or purifying water of a water distribution system, such as a potable water distribution system for aircraft, that provides for water boiler expansion pressure relief by permitting the water boiler expansion pressure to be directed backwards along the water transmission lines of the water distribution system and back towards the water supply source (e.g., a water supply tank) of the water distribution system, while guarding against any water contaminated from biofilm, bacteria, viruses, pathogenic cysts, and other microorganisms downstream of the apparatus from backflowing into a water filtration/purification canister of the apparatus provided for filtering and/or conditioning and/or purifying water of the water distribution system and contaminating the portion of the canister downstream of the medium held in the canister for filtering and/or conditioning and/or purifying water and thereby causing the water exiting the outlet port of the canister to be contaminated.

This object, as well as other objects, are provided by our invention, a description of which is set out below.

BRIEF DESCRIPTION OF THE DRAWINGS

FIG. 5 is a view in perspective showing the interface 13 of the invention with the mounting bracket 221 and the end cap holder 309 (with the end cap 291 stored therein) mounted to the interface 13.

FIG. 6 is an exploded view of the apparatus 11 without the pressure vessel 15 but with the end cap 291 and the end cap holder 309. When the valve 21 and the valve 95 are assembled, springs 40 are located within the valve housing 23 of each valve.

FIG. 7 is a view in perspective of the interface 13 constructed in accordance with the invention, prior to the inlet port member 233, the o-ring 236, the outlet port member 234, and the o-ring 238 being secured to the interface by the plate 223 of the mounting bracket 221.

FIG. 8 is a bottom plan view of the interface 13 shown in FIG. 7.

FIG. 9 is a view in cross-section taken along the lines and arrows 9-9 shown in FIG. 8.

FIG. 10 is a view in cross-section taken along the lines and arrows 10-10 shown in FIG. 8.

FIG. 11 is a view in cross-section taken along the lines and arrows 11-11 shown in FIG. 8.

FIG. 29 is an enlarged view of a portion of FIG. 2, except the lug 207 on the right side of FIG. 2 has been omitted from FIG. 29 to more clearly show the ridge or ramp 119 on which the lugs 207 are formed, and except that the end cap holder 309, the snap ring 319, the capture ring interlock 321, the end cap 291, and the cable 329 have been omitted from FIG. 29 to more clearly show other features of the invention.

DETAILED DESCRIPTION

Figure 1:
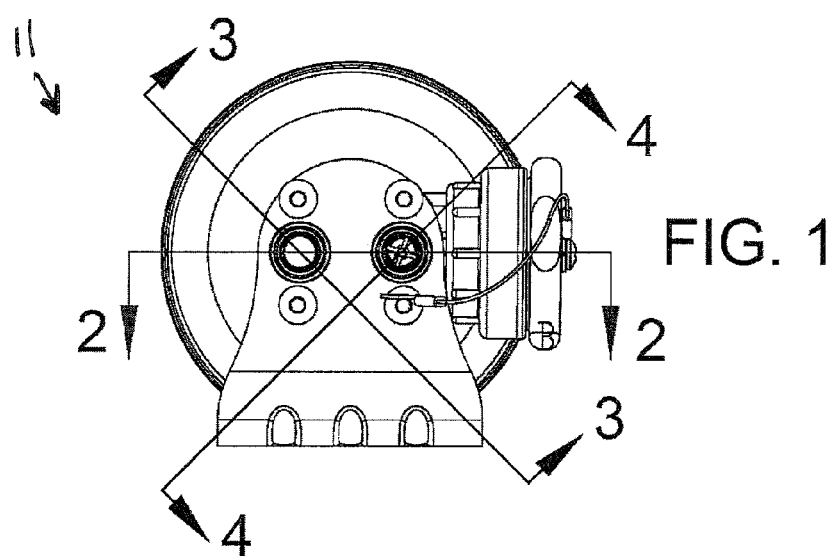
FIG. 1 is a bottom plan view an apparatus 11 for filtering and/or conditioning and/or purifying a fluid such as water, constructed in accordance with the invention.

Turning now to the drawings, there is shown the inventive apparatus 11 for filtering and/or conditioning and/or purifying a fluid, such as water. (Purification, per EPA regulations, requires performance meeting the EPA Guide Standard Protocol for Microbiological Purifiers; filtration and conditioning may be almost anything else that is useful, such as taste and odor removal, scale control, etc.)

Referring particularly to FIGS. 1 to 11, and more particularly to FIG. 29, apparatus 11 includes an interface 13 (also known as an automatic valving unit or a valve head or manifold) for a filtration/purification canister 14 comprising a pressure vessel 15 that holds a cartridge 16, or loose media, or the like for filtering and/or conditioning and/or purifying a fluid, such as water. The interface 13 automatically provides for fluid flow into the pressure vessel 15 when the pressure vessel 15 is connected to the interface 13, and automatically discontinues fluid flow from the interface 13 when the pressure vessel 15 is disconnected from the interface 13.

The interface 13 preferably is machined from a metal such as stainless steel or aluminum preferably coated and sealed with a hard aluminum oxide coating for scratch resistance and long life.

As shown in FIG. 29, the interface 13 has a first passageway 17 extending through it and adapted to be connected to a fluid transmission line, such as a water supply line of an aircraft potable water distribution system. Preferably, the interface 13 has a threaded inlet port 19 at the entrance of the first passageway 17 that receives a threaded female fitting of the fluid transmission line.

Referring particularly to FIG. 29, a first valve 21 is positioned against an annular ledge 22 formed in the first passageway 17 of the interface 13 for blocking flow of fluid through the first passageway 17 when the valve 21 is closed. Preferably, the first valve 21 is a spring-loaded check valve (hereinafter referenced to as "first check valve 21" or "valve 21"), and preferably first check valve 21 includes a valve housing 23 (preferably made of a suitable polymeric material) having an annular ring-shaped base portion 25 that has an annular inner wall surface 27. An annular ledge 29 is formed on the inner wall surface 27 creating a valve seat 31. Preferably, a groove (not shown) is formed in the outer wall surface of the base portion 25 of the valve housing 23 and extends around the base portion 25, and an o-ring (not shown) is positioned in and extends partially from the groove to facilitate the formation of a seal between the valve housing 23 and a portion of the surface of the interface 13 that defines the first passageway 17.

Preferably, the first check valve 21 also includes a movable valve disk 33 (preferably made of a suitable polymeric material) that is contained within the valve housing 23 and closes the first check valve 21 when the valve disk 33 rests against the valve seat 31 and that permits flow of fluid through the first check valve 21 when the valve disk 33 is not resting against the valve seat 31. The valve housing 23 preferably also includes a plurality of arms 35 that extend away from the base portion 25 of the valve housing 23 and over the opening in the valve housing 23 formed by the annular ring-shaped base portion 25 to form a cage-like structure that contains the valve disk 33 in the valve housing 23. As shown in FIGS. 29 and 6, preferably the valve disk 33 has a guide pin 37 formed on and extending upstream from its upstream face that is engaged by and slides in a guide pin holder 39 (a small hollow cylinder) formed on the ends of the arms 35 where the arms 35 meet over the opening in the annular ring-shaped base portion 25 to keep motion of the valve disk 33 on a line that permits proper seating of the valve disk 33 on the valve seat 31. A spring 40 (FIG. 29) is provided in valve 21 to bias the valve 21 in a closed position. That is, the spring 40 is provided in valve 21 to bias the valve disk 33 against the valve seat 31.

An outlet port 41 is formed at the outlet end portion of the first passageway 17 of the interface 13.

Referring to FIG. 29, the pressure vessel 15 has an inlet port 43 that is in fluid communication with the outlet port 41 formed at the outlet end portion of the first passageway 17 in the interface 13 when the pressure vessel 15 is connected to the interface 13. The pressure vessel 15 has a first passageway 45 extending from the inlet port 43 of the pressure vessel 15 to the cartridge 16, or loose media, or the like, through which the fluid passes to filter and/or condition and/or purify the fluid, and a second passageway 47 extending from the cartridge 16, or loose media, or the like to an outlet port 49 of the pressure vessel 15.

Referring to FIG. 29 again, the interface 13 also is provided with a second passageway 51 extending through it and adapted to be connected to a fluid receiving line (such as a water faucet of an aircraft potable water distribution system or an apparatus such as a coffee maker used on an airplane) at an outlet port 53 of the second passageway 51. Preferably, the outlet port 53 has a threaded fitting that is received in a threaded female fitting of the fluid receiving line.

Figure 2:
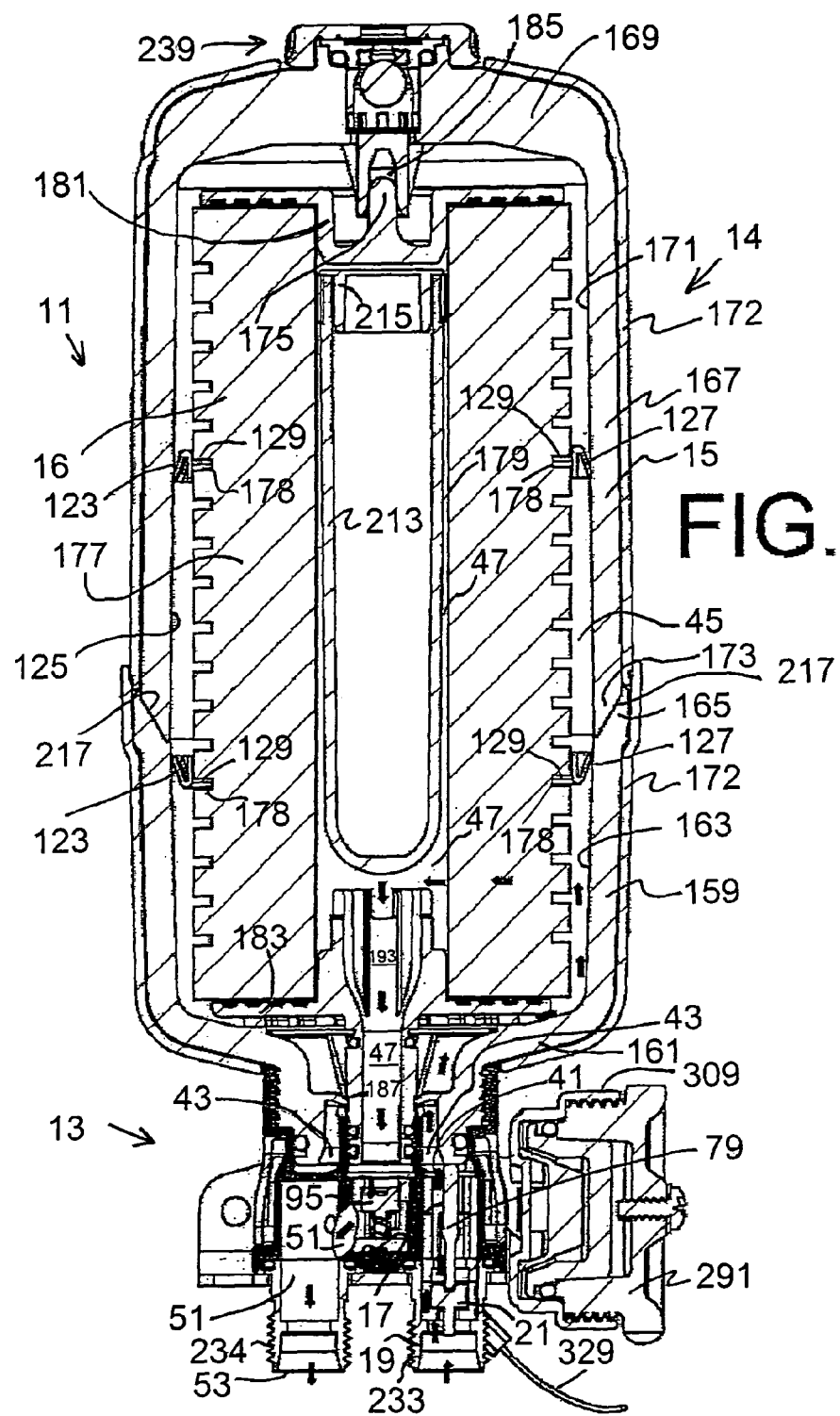
FIG. 2 is a view in cross-section taken along the lines and arrows 2-2 shown in FIG. 1.

Referring to FIGS. 29, 2, and 9, the interface 13 has an inlet port 55 formed at an inlet portion of the second passageway 51 in the interface 13 that is in fluid communication with the outlet port 49 of the pressure vessel 15 when the pressure vessel 15 is connected to the interface 13.

Referring to FIG. 29, connecting/disconnecting means is provided for connecting the pressure vessel 15 to the interface 13, when desired, to permit flow of fluid from the first passageway 17 in the interface 13 to the inlet port 43 of the pressure vessel 15, and for disconnecting the pressure vessel 15 from the interface 13, when desired, to stop flow of fluid from the first passageway 17 in the interface 13. Preferably, the connecting/disconnecting means comprises threads 57 formed on the outer surface of the neck 59 of the pressure vessel 15 and matching threads 61 formed on the interface 13, such as that disclosed in Williams U.S. Pat. No. 5,695,168, which is incorporated herein in its entirety by reference.

Alternatively, the connecting/disconnecting means may comprise a bayonet-style mount, including a plurality of grooves formed on the neck 59 of the pressure vessel 15, and a corresponding number of pins mounted on the interface 13, such as that shown in our U.S. patent application Ser. No. 12/319,219, which is incorporated herein in its entirety by reference. Each groove has a first end portion where a corresponding pin may be inserted and moved along the groove by turning the pressure vessel 15 around its central axis until the pin reaches a second end portion of the groove, thereby securing the pressure vessel 15 to the interface 13.

Referring again to FIGS. 29 and 6, actuating means is provided for automatically opening the valve 21 when the pressure vessel 15 is connected to the interface 13. Preferably, the actuating means includes a pin 79 that is positioned in the first passageway 17 of the interface 13 between the valve disk 33 and the outlet port 41 at the outlet end portion of the first passageway 17 of the interface 13. The pin 79 has a first end portion 81 and a second end portion 83, the first end portion 81 engaging the valve disk 33 by being received in a bore 85 formed in the downstream face of the valve disk 33, and the second end portion 83 being held by a pin holder 87 (positioned between valve 21 and an annular ledge 89 (which prevents the pin holder 87 from falling out of the first passageway 17 through the outlet port 41 of the interface 13) in the first passageway 17) in which the pin 79 is free to slide back and forth along the center axis of the pin 79. A radially extending ridge 91 is provided on the pin 79 to abut against a portion 90 of the pin holder 87 to prevent the pin 79 from falling completely out of the first passageway 17 through the outlet port 41. The cross-section of the pin 79, even at the ridge 91, is smaller than the cross-section of the first passageway 17 so that fluid may flow through the first passageway 17 where the pin 79 is positioned when the valve 21 is open. Also, when the valve 21 is open, fluid may pass through the first passageway 17 where the pin holder 87 is located by passing between the spacing flanges 92 (three such spacing flanges 92 being used in the embodiments of the invention shown in the drawings), which surround and position a tubular section 93 (which holds the second end portion 83 of the pin 79 in a sliding relationship) in the first passageway 17 in alignment with the valve disk 33.

The length of the pin 79 is such that when the pressure vessel 15 is connected to the interface 13, the first end portion 73 of the neck 59 of the pressure vessel 15 pushes against the pin 79 causing the first end portion 81 of the pin 79 to push the valve disk 33 off and sufficiently away from the valve seat 31 to open the valve 21 to permit flow of fluid through the valve 21 and passageway 17.

Referring to FIGS. 29, 2, 6, and 9 in particular, preferably, the interface 13 also is provided with a second valve 95 that is positioned on an annular ledge 97 formed in the second passageway 51 of the interface 13 for blocking backflow of fluid from the second passageway 51 of the interface 13 to the inlet port 55 at the inlet portion of the second passageway 51 of the interface 13 (and into the outlet port 49 of the pressure vessel 15 if the pressure vessel 15 is secured onto the interface 13). Preferably, the second valve 95 is a spring-loaded check valve (hereinafter referred to as "second check valve 95" or "valve 95"), and preferably second check valve 95 has the same structure as first check valve 21 and includes a valve housing 23 which contains a movable valve disk 33, as described above for the first check valve 21. Like first check valve 21, a spring 40 is provided in second check valve 95 to bias the valve 95 in a closed position. That is, the spring 40 of valve 95 is provided to bias the valve disk 33 of valve 95 against the valve seat 31 of valve 95. The flow of fluid from the pressure vessel 15 pushes the movable disk 33 of the second check valve 95 off the valve seat 31 of the second check valve 95 and moves it in the downstream direction away from the valve seat 31 of the second check valve 95 to permit fluid flowing from the pressure vessel 15 to flow through the second check valve 95 and through the second passageway 51 of the interface 13 to the fluid receiving line connected to the outlet port 53 of the second passageway 51 of the interface 13. However, backflow of fluid through the second passageway 51 of the interface 13 to the inlet port 55 at the inlet portion of the second passageway 51 of the interface 13 (and into the outlet port 49 of the pressure vessel 15 if the pressure vessel 15 is secured onto the interface 13) is blocked by the second check valve 95 due to the spring 40 of the valve 95 pushing the valve 95 into a closed position if flow of fluid through the second valve 95 from upstream of the valve 95 to downstream of the valve 95 ceases and due to any backflow of fluid pushing the moveable disk 33 of the second check valve 95 onto the valve seat 31 of the second check valve 95, thereby causing the second check valve 95 to close. The second check valve 95 is inserted through the inlet port 55 into the second passageway 51 until it engages a ledge 97, and then a snap ring 98, preferably made of stainless steel, is inserted into an annular groove 100 formed in the interface 13 along the second passageway 51 to hold the second check valve 95 in place in the second passageway 51. The second check valve 95 may be removed from the second passageway 51 for cleaning, repair, or replacement by removing the snap ring 98 from the groove 100 to permit the second check valve 95 to be slide from the second passageway 51 through the inlet port 55.

Figure 3:
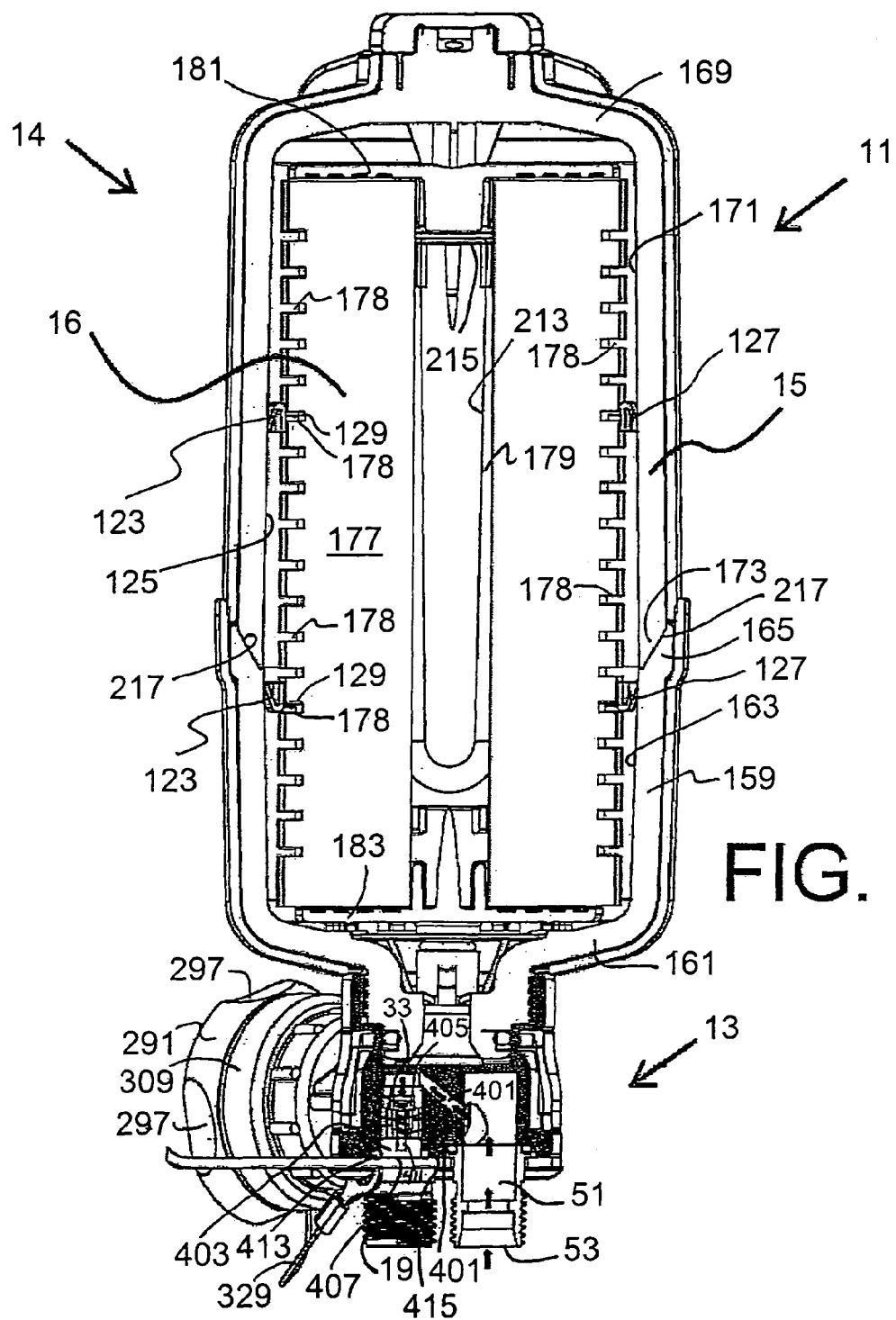
FIG. 3 is a view in cross-section taken along the lines and arrows 3-3 shown in FIG. 1.
Figure 4:
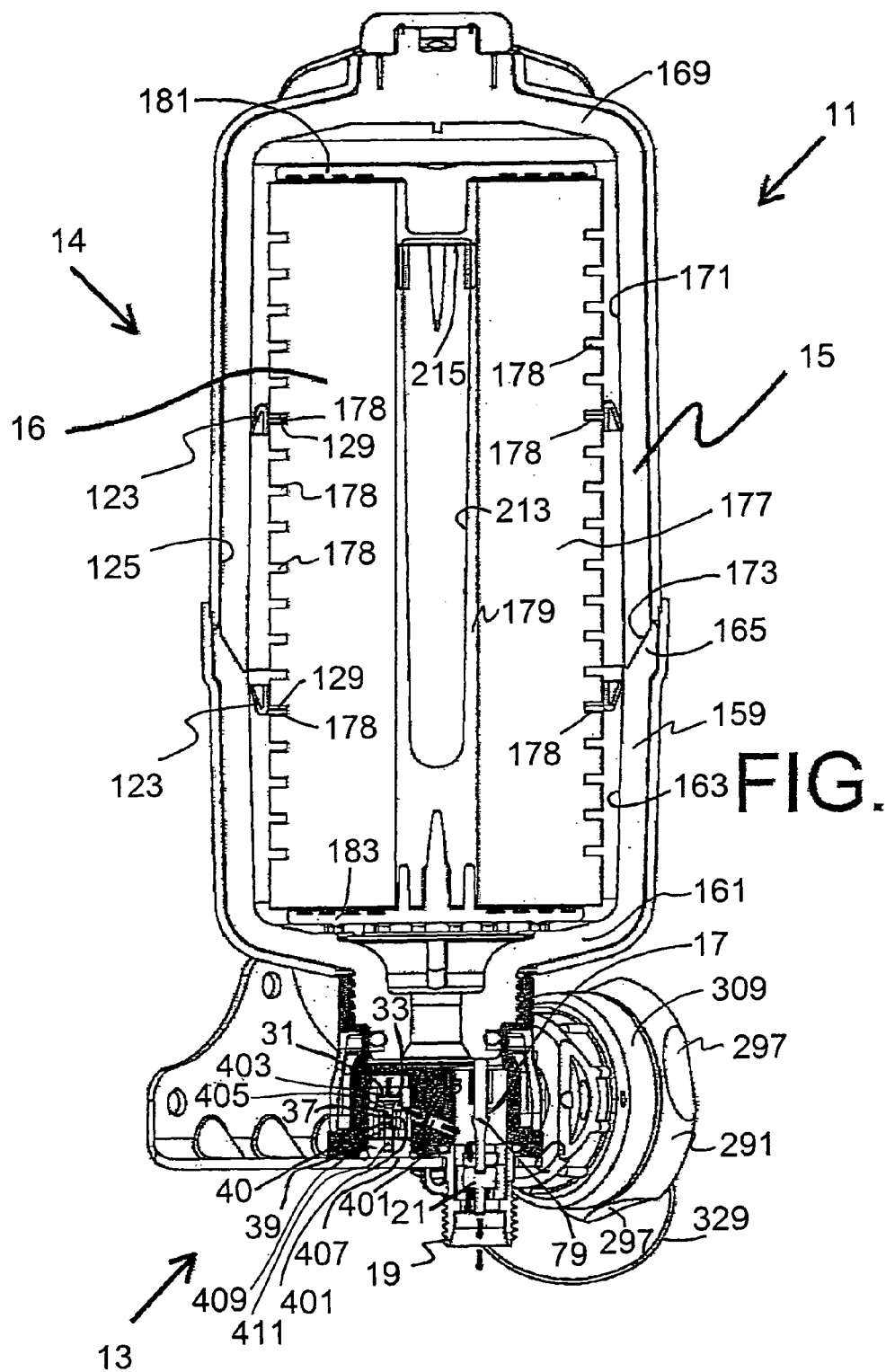
FIG. 4 is a view in cross-section taken along the lines and arrows 4-4 shown in FIG. 1.
Figure 12:
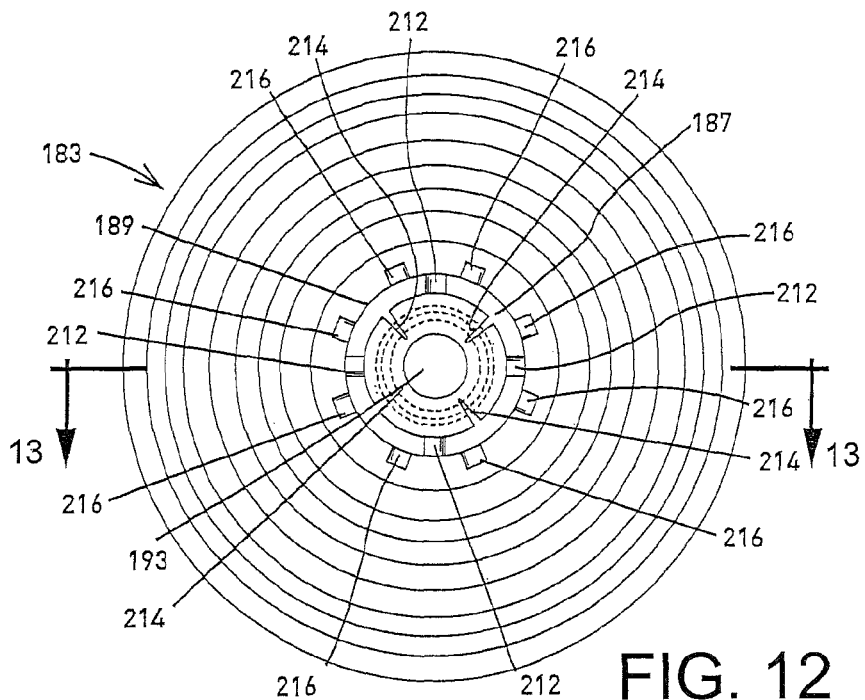
FIG. 12 is a view in bottom plan of the end cap 183 which has a hollow tube 187 that functions as the outlet port from the canister 14 (the pressure vessel 15 having the cartridge 16 mounted therein).
Figure 13:
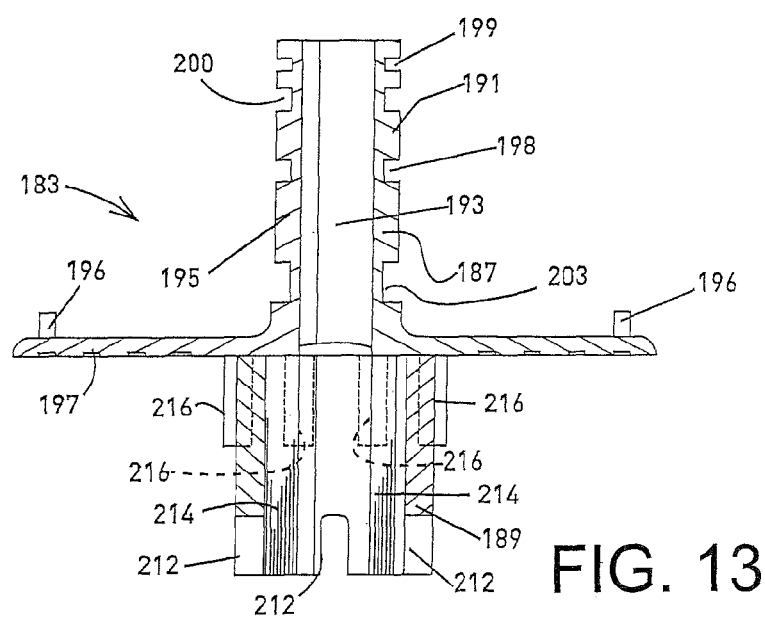
FIG. 13 is a view in cross-section taken along the lines and arrows 13-13 shown in FIG. 12.

Referring to FIGS. 2 to 4, the pressure vessel 15 includes a cover 159 having a top wall 161 and a side wall 163, which has a lower end portion on which a cover rim 165 is formed. The pressure vessel 15 also includes a bowl 167 having a bottom wall 169 and a side wall 171, which has an upper end portion on which a bowl rim 173 is formed. Preferably, the pressure vessel 15 is provided with a protective shell 172, and preferably the protected shell 172 is fire resistant.

In the embodiment of the invention illustrated in the drawings, the means for filtering and/or conditioning and/or purifying a fluid comprises a cartridge 16. As shown in FIGS. 2 to 4, and 29, preferably, the cartridge 16 comprises a cylindrical microfiltration matrix 177 for filtering and/or conditioning and/or purifying a fluid passing through it. The matrix 177 has a cylindrical channel 179 along its center axis that receives the fluid after it has passed through the matrix 177, the channel 179 comprising part of the second passageway 47 of the pressure vessel 15. An end cap 181 is secured to the bottom end of the matrix 177, and an end cap 183 is secured to the top end of the matrix 177. To secure the cartridge 16 inside the pressure vessel 15, the bowl 167 is provided with a recess 185 formed in the bottom wall 169 of the bowl 167 that receives a stabilizing stub 175 formed in the end cap 181 to prevent the cartridge 16 from swaying back and forth inside the pressure vessel 15 during use.

Referring to FIGS. 29, 2, 12, and 13, the end cap 183 comprises a hollow tube 187 having a first end portion 189, a second end portion 191, and a passageway 193 extending through the tube 187 from the first end portion 189 (where it receives fluid from the channel 179) to the second end portion 191, the passageway 193 also comprising part of the second passageway 47 of the pressure vessel 15. The tube 187 has an exterior surface portion 195 onto which is integrally formed therewith a flange portion 197 that engages the top end of the matrix 177. Preferably, the tube 187 has two annular grooves 199 and 200 formed at its second end portion 191 that receive o-rings 201 and 202 for sealing between the tube 187 and the hollow cylindrical inlet port 55 to the second passageway 51 in the interface 13 (thereby establishing a sealed connection between the outlet port 49 of the pressure vessel 15 and the inlet port 55 to the second passageway 51 in the interface 13) when the pressure vessel 15 is connected to the interface 13. Preferably, the second end portion 191 of the tube 187 is provided with an antimicrobial surface, such as by impregnating the second end portion 191 with antimicrobial materials such as those sold by AgION Technologies, Inc., of Wakefield, Mass.

Figure 14:
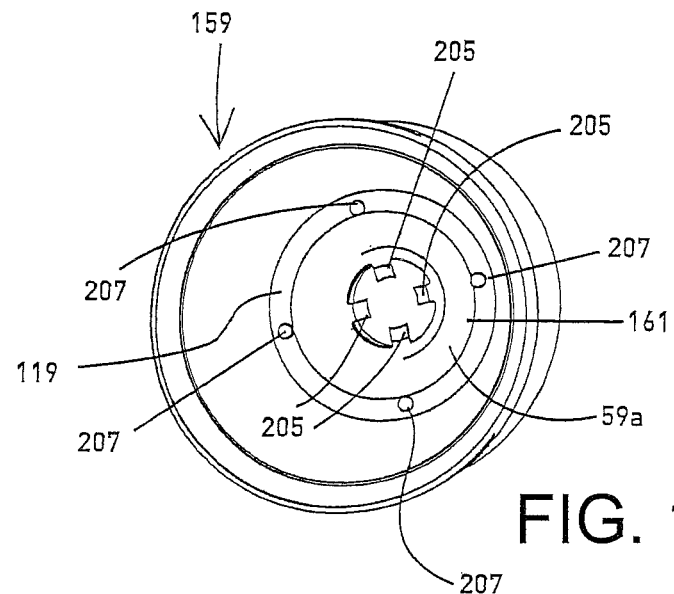
FIG. 14 is a view in perspective of the cover 159 of the pressure vessel 15, showing the inside of the cover 159.
Figure 15:
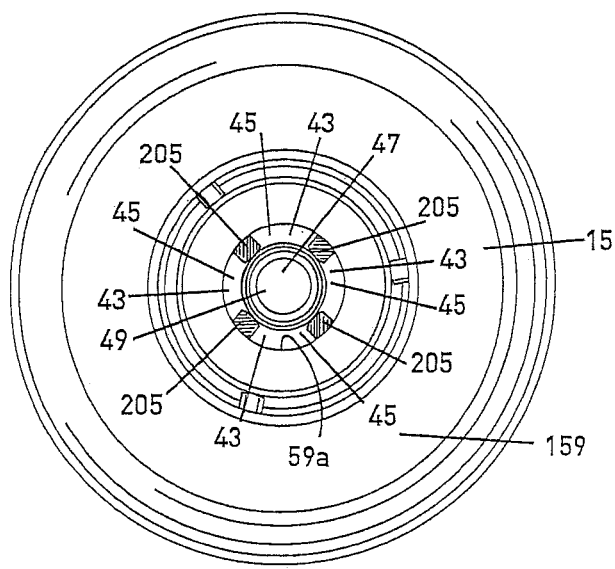
FIG. 15 is a top plan view of a canister 14 (the pressure vessel 15 containing a cartridge 16) of the invention.

Referring to FIGS. 29, 2, 12, and 13 again, the tube 187 also has another annular groove 198 formed in the second end portion 191 that receives a plurality of fingers or projections 205 (four fingers 205 being used in the embodiment of the invention shown in the drawings) (see FIGS. 14 and 15) integrally formed with the neck 59 and extending inwardly from the wall 59a of the neck 59 for positioning the tube 187 so that it extends along the central axis of the neck 59 and secures the cartridge 16 against both horizontal and vertical movement in the pressure vessel 15. Also, a plurality of projections or lugs 207 (there being four lugs 207 used in the embodiment of the invention shown in the drawings) preferably is provided on an annular ridge or ramp 119 that preferably is formed in the top wall 161 of the cover 159. The lugs 207 abut against the flange portion 197 of the end cap 183 to secure the cartridge 16 against vertical movement in the pressure vessel 15. A plurality of evenly spaced apart lugs 196 is formed on the flange 197 of the end cap 183 around its peripheral portion, and the lugs 207 also abut against the flange 197 between a pair of the lugs 196 to secure the cartridge 16 against rotational movement in the pressure vessel 15. If the ridge or ramp 119 is not provided, the lugs 207 preferably are still provided by forming them in the top wall 161 of the cover 159.

Referring to FIG. 29, preferably, the pressure vessel 15 is provided with a flapper valve 211, which includes a flexible disk 209. A groove 203 receives the center portion of a flexible disk 209, that extends outwardly from the tube 187 and, when the flapper valve 211 is in a first or "closed" position, engages a portion of the neck 59 formed in the cover 159 to close the flapper valve 211 to reduce/prevent fluid from back flowing from the inlet port 43 of the pressure vessel 15. When the pressure vessel 15 is not connected to the interface 13, any backflow of fluid in the first passageway 45 of the pressure vessel 15 pushes against the side 122 of the disk 209 facing away from the inlet port 43 of the pressure vessel 15 to push the disk 209 into contact with the interior neck wall 59a of the pressure vessel 15 to close the flapper valve 211 and the first passageway 45 of the pressure vessel 15 at the flapper valve 211 to reduce/prevent backflowing of fluid from the inlet port 43 of the pressure vessel 15. The flapper valve 211 prevents backflow of fluid from the first passageway 45 of the pressure vessel 15, because any flow of fluid back flowing from downstream to upstream in the first passageway 45 of the pressure vessel 15 when the disk 209 of the flapper valve 211 is not being prevented from moving into contact with the neck wall 59a pushes against the flexible disk 209 causing it to flex into engagement with the neck wall 59a formed in the cover 159 to close the flapper valve 211, thereby blocking backflow of fluid from the first passageway 45 of the pressure vessel 15.

Preferably, the width of the groove 203 (that is, the distance across the groove 203) is such that the disk 209 is movable axially along the tube 187 in the annular groove 203 formed on the tube 187 between a closed position for the flapper valve 211, in which the disk 209 closes the first passageway 45 of the pressure vessel 15 by extending across the first passageway 45 of the pressure vessel 15 and into contact against a portion of the neck wall 59a of the pressure vessel 15 along the first passageway 45 of the pressure vessel 15 and thereby reduce/prevent fluid from back flowing from the inlet port 43 of the pressure vessel 15, and an open position for the flapper valve 211, in which the disk 209 is positioned out of contact with the neck wall 59a of the pressure vessel 15 along the first passageway 45 of the pressure vessel 15 to open the first passageway 45 of the pressure vessel 15 to fluid flow through the first passageway 45 of the pressure vessel 15.

Figure 16:
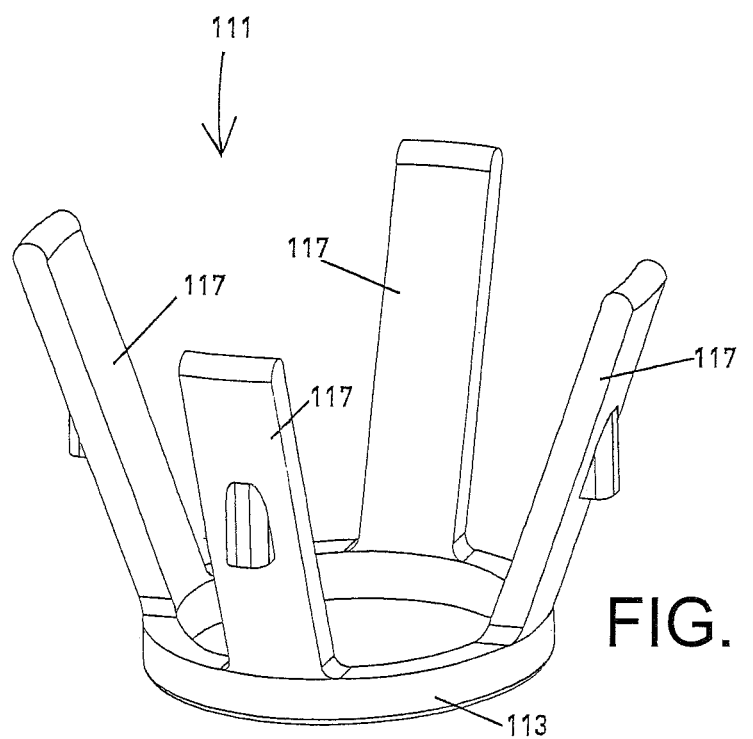
FIG. 16 is a view in perspective of the actuating means 111 for automatically opening the flapper valve 211 when the pressure vessel 15 is connected to the interface 13.

Preferably, the flapper valve 211 also includes an actuating means 111 (see FIGS. 29 and 16) for automatically opening the flapper valve 211 when the pressure vessel 15 is connected to the interface 13. In the embodiment of the invention shown in the drawings, the actuating means 111 includes a ring 113 positioned around the exterior surface portion 195 of the tube 187. The ring 113 is movable axially along the tube 187. The ring 113 has at least one projection or leg 117 (there being four legs 117 in the embodiment of the invention shown in the drawings) extending from it towards the disk 209, and the at least one projection or leg 117 moves towards and into contact with the disk 209 when the ring 113 is moved towards the disk 209 to push the disk 209 out of contact with the neck wall 59a of the pressure vessel 15 along the first passageway 45 of the pressure vessel 15 to open the first passageway 45 of the pressure vessel 15.

The actuating means 111 further includes an end portion 112 of the inlet port 55 of the interface 13 that engages and pushes the ring 113 towards the disk 209 such that the at least one projection or leg 117 extending from the ring 113 towards the disk 209 moves into contact with the disk 209 and raises the disk 209 out of contact with the neck wall 59a of the pressure vessel 15 along the first passageway 45 of the pressure vessel 15 when the pressure vessel 15 is connected to the interface 13 to place and maintain the flapper valve 211 in the open position while the pressure vessel 15 is connected to the interface 13.

Preferably, the at least one projection or leg 117 extends from the ring 113 such that the at least one projection or leg 117 is angled away from the tube 187. The ring 113 is positioned on the tube 187 around the second end portion 191 of the tube 187 such that the at least one projection or leg 117 extends inwardly into the pressure vessel 15 past the fingers or projections 205. Accordingly, when the pressure vessel 15 is not connected to the interface 13, the ring 113 is blocked from falling out of the pressure vessel 15 by the outwardly angled at least one projection or leg 117 abutting against a portion of the neck wall 59a. Because the at least one projection or leg 117 is resilient, the at least one projection of leg 117, when being installed into position on the tube 187, may be squeezed inwardly and pushed past the flanges 205 and then released to angle outwardly away from the tube 187 again, so that when the pressure vessel 15 is not connected to the interface 13, the at least one projection or leg 117 is angled away from the tube 187 so that a portion of the at least one projection or leg 117 abuts against a portion of the neck wall 59a before the ring 113 may move in the axial direction off the tube 187.

When the flapper valve 211 is in an open position and fluid is flowing from upstream to downstream in the first passageway 45 of the pressure vessel 15, the fluid pushes against the flexible disk 209 causing it to flex in the downstream direction away from the neck wall 59a to open the first passageway 45 further to permit fluid to flow into the pressure vessel 15.

Preferably, the annular ridge or ramp 119 (see FIG. 29) formed on a portion of the interior neck wall 59a (that is, the top wall 161 of the cover 159) of the pressure vessel 15 along the first passageway 45 of the pressure vessel 15 downstream of the disk 209 of the flapper valve 211 and surrounding the outer periphery 121 of the disk 209 of the flapper valve 211. The ridge or ramp 119 causes fluid back flowing in the first passageway 45 of the pressure vessel 15 from downstream of the ridge or ramp 119 to upstream of the ridge or ramp 119 to move over the ridge or ramp 119 and onto the side 122 of the disk 209 facing away from the inlet port 43 of the pressure vessel 15 to push the disk 209 into contact with the interior neck wall 59a of the pressure vessel 15 to close the first passage 45 of the pressure vessel 15 at the flapper valve 211 to reduce/prevent backflowing of fluid from the inlet port 43 of the pressure vessel 15.

Preferably, the flapper valve 211 also includes an o-ring 204 positioned in the groove 203 on the tube 187 upstream of the disk 209 of the flapper valve 211 for sealing between the disk 209 and the tube 187 when the disk 209 pushes against the o-ring 204 when the flapper valve 211 is in a closed position.

Referring to FIGS. 2 to 4, preferably at least one ring 123 is positioned adjacent to and between the cartridge 16 and the interior wall 125 of the main portion of pressure vessel 15. The ring 123 has outwardly extending resilient flanges 127 that engage the interior wall 125 of the pressure vessel 15 and act as shock absorbers to guard against damage to the cartridge 16 if the pressure vessel 15 is dropped. The ring 123 also has a resilient inwardly extending annular flange 129 formed on top portion of the ring 123, and the flange 129 may be pushed to temporarily bend toward the top portion of the ring 123 to permit the flange 129 to slide over the exterior surface of the matrix 177 until the ring 123 is positioned at as desired location on the matrix 177 where the flange 129 may snap back to rest in a groove or cut 178 formed in the exterior surface of the matrix 177.

Referring to FIGS. 2 to 4, preferably, a compressible soft, pliable tube 213 (preferably made of polyurethane) having a closed end and an open end closed off by a cap 215 is positioned in the pressure vessel 15 in the channel 179 such that there is still space for fluid to flow through the channel 179 between the matrix 177 and the compressible tube 213. The compressible tube 213 provides protection against damage to the pressure vessel 15 and/or the matrix 177 if the fluid to be filtered and/or conditioned and/or purified freezes while in the pressure vessel 15, by providing space for the fluid to expand into if the fluid (for example, water) is the type of fluid that expands during freezing. The compressible tube 213 also provides protection for the pressure vessel 15 against possible millisecond and microsecond pressure spikes. Also, because the compressible tube 213 contains air, the operating weight of the pressure vessel 15 is lighter than the pressure vessel 15 not having a compressible tube 213 since part of the space inside the pressure vessel 15 is occupied by air (contained within the compressible tube 213) instead of the fluid being treated in the pressure vessel 15, and air weighs less than the fluid being treated, if the fluid being treated is water.

Referring again to FIGS. 12 and 13, the tube 187 also has a plurality of fins or flanges 214 (four such fins 214 being used in the embodiment shown in the drawings) formed on its interior surface portion in the first end portion 189 of the tube 187 that extend inwardly into the passageway 193 towards its central axis. Fluid may flow along the passageway 193 past the fins 214. Further, the tube 187 is provided with a plurality of cutouts 212 (four such cutouts 212 being used in the embodiment shown in the drawings) made thereon to permit fluid that has been filtered and/or conditioned and/or purified in the pressure vessel 15 to flow into the tube 187 from the channel 179 through the cutouts 212. If the compressible tube 213 ever abuts against the first end portion 189 of the tube 187, the fins 214 block the compressible tube 213 from entering the tube 187, and the cutouts 212 permit fluid to continue to flow into the tube 187 even if the compressible tube 213 abuts against the first end portion 189 of the tube 187.

The tube 187 also is provided with a plurality of ribs 216 (eight such ribs 216 being used in the embodiment shown in the drawings) formed in its first end portion 189 on the exterior surface portion 195 adjacent to the flange portion 197 for engaging the matrix 177 along a portion of the channel 179 extending therethrough and for centering the tube 187 in the channel 179.

The cover 159 and the bowl 167 preferably are made from a polymeric material, and after the cartridge 16 is positioned on the cover 159 and the bowl 167, the cover 159 and the bowl 167 are joined together along their respective rims 165 and 173, preferably by spin welding, to form a sealed seam portion 217.

Figure 17:
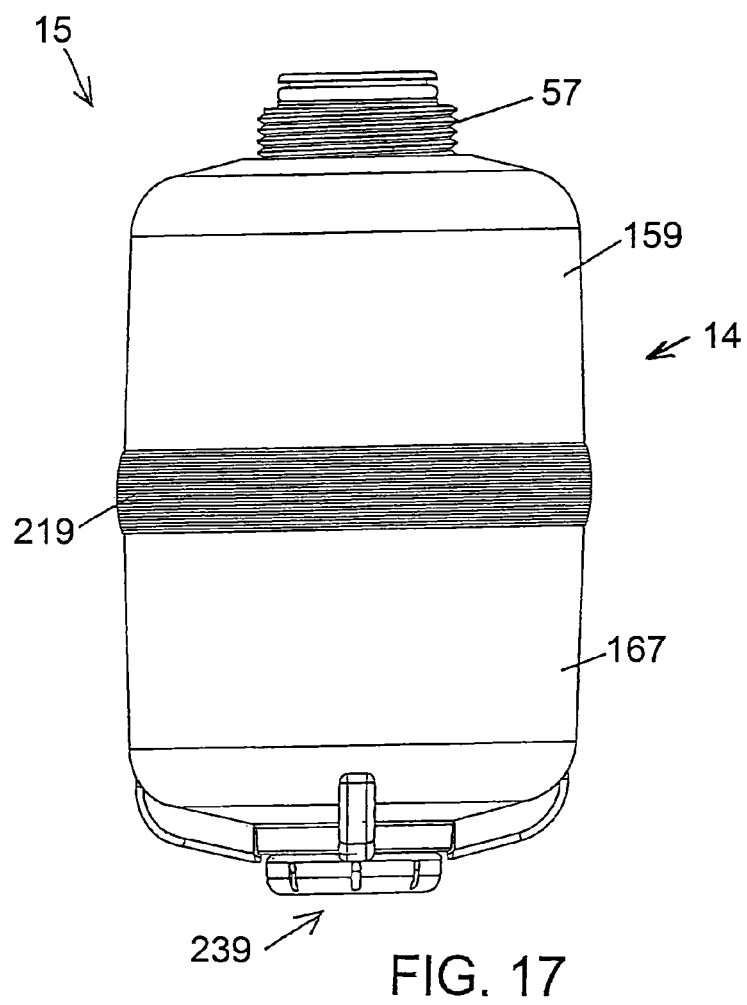
FIG. 17 is a view in front elevation of a pressure vessel 15 that is provided with a reinforcement member 219 secured around the sealed seam portion 217 of the pressure vessel 15.

Preferably, a reinforcement member 219 (FIG. 17) is secured around the pressure vessel 15, preferably around the side walls 163 and 171 of the pressure vessel 15 at and near the seam portion 217 of the pressure vessel 15 for reinforcing the pressure vessel 15, and preferably the seam portion 217 and the side walls 163 and 171 of the pressure vessel 15 at the seam portion 217. For example, the reinforcement member 219 may comprise fibers, such as carbon fibers or fiberglass or aramid fibers (e.g., Kevlar fibers) wrapped around the pressure vessel 15 and held together with epoxy or polyurethane or other binder. The reinforcement member 219 also may comprise reinforcing metal or other clamping device.

Figure 18:
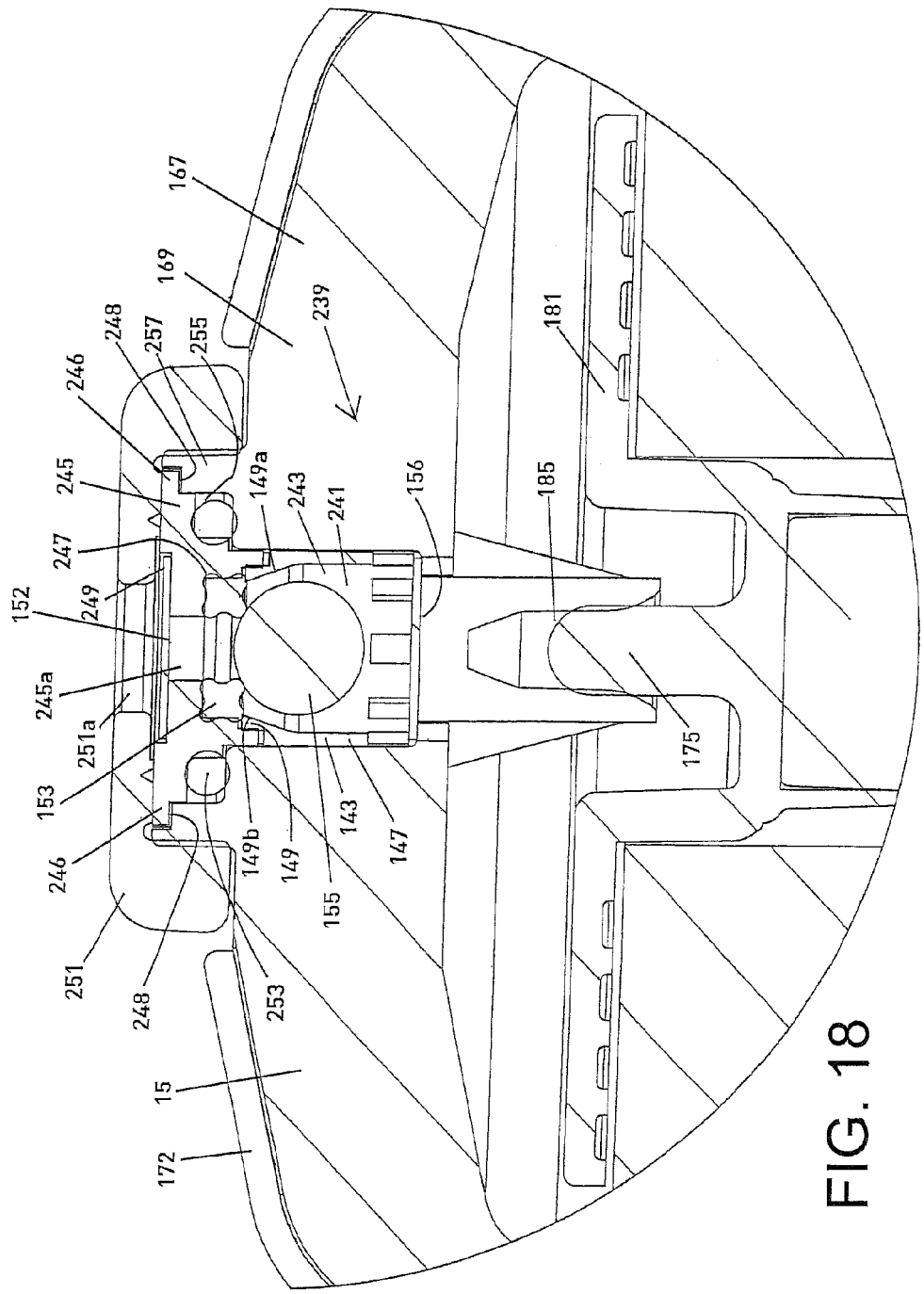
FIG. 18 is a partial view in cross-section showing an automatic venting device 239 formed in the bowl 167 of the pressure vessel 15, constructed in accordance with the invention.
Figure 19:
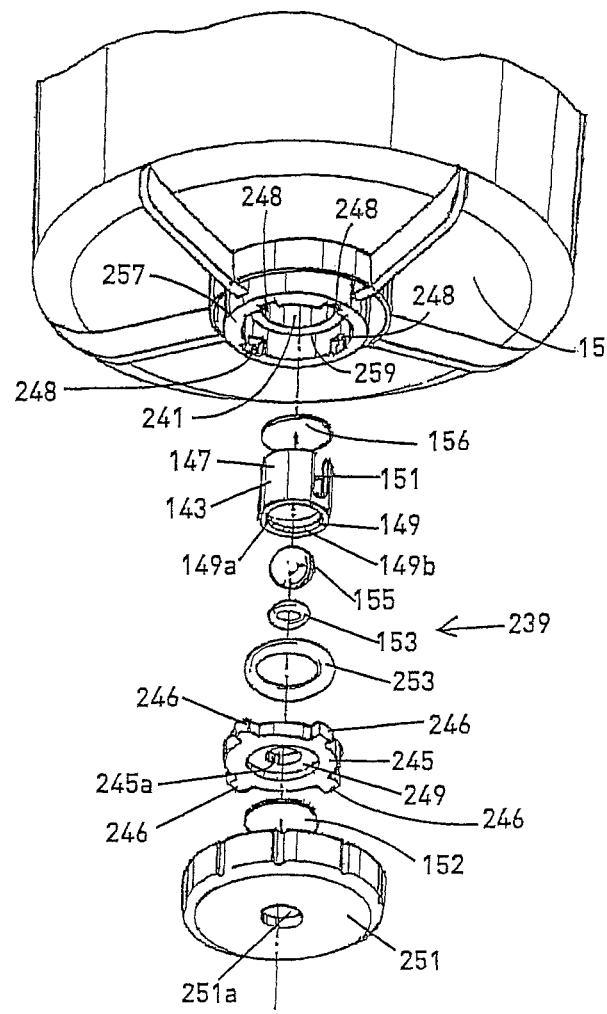
FIG. 19 is an exploded view of the automatic venting device 239 shown in FIG. 18.
Figure 20:
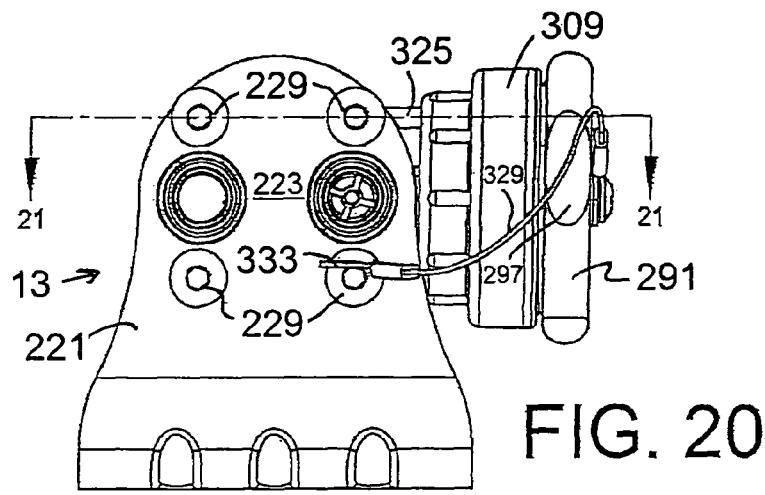
FIG. 20 is a bottom plan view of the interface 13, the mounting bracket 221, the end cap holder 309, and the end cap 291 shown in FIG. 5.
Figure 21:
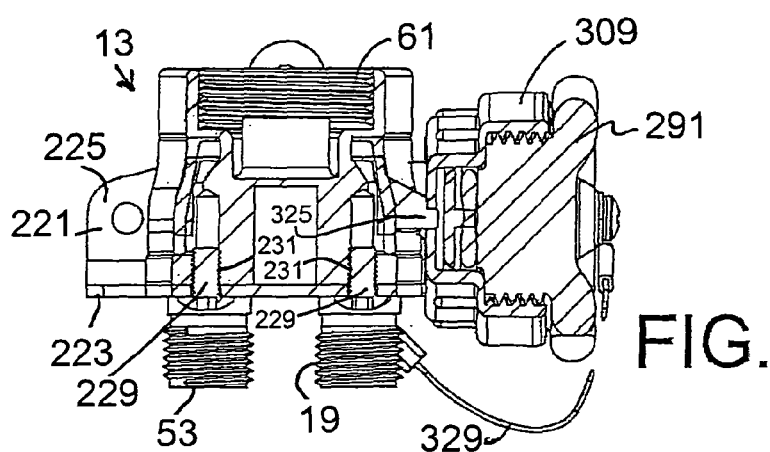
FIG. 21 is a view in cross-section taken along the lines and arrows 21-21 shown in FIG. 20.
Figure 22:
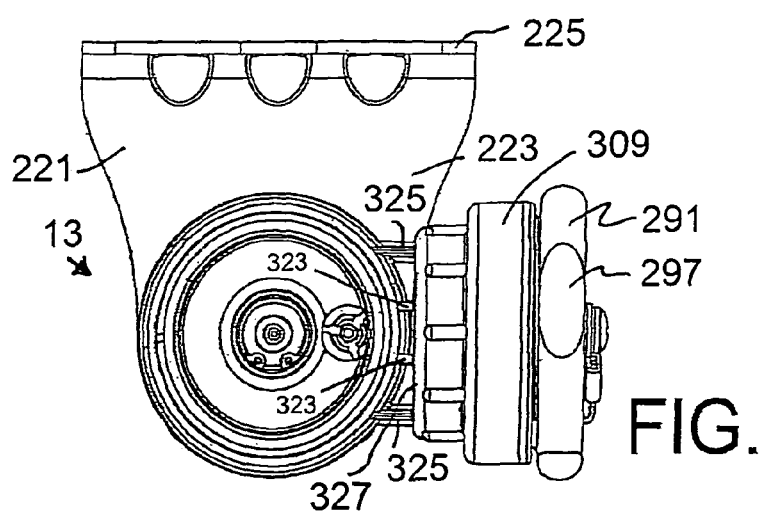
FIG. 22 is a top plan view of the interface 13, the mounting bracket 221, the end cap holder 309, and the end cap 291 shown in FIG. 5.
Figure 23:
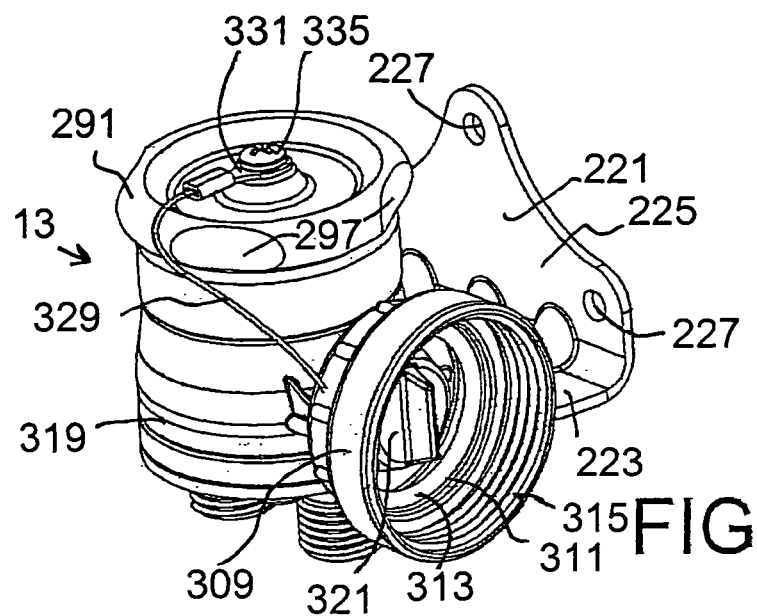
FIG. 23 is a view in perspective of the interface 13 showing the mounting bracket 221 mounted on the interface 13 and the end cap 291 screwed into the recess 241 in the interface 13.
Figure 24:
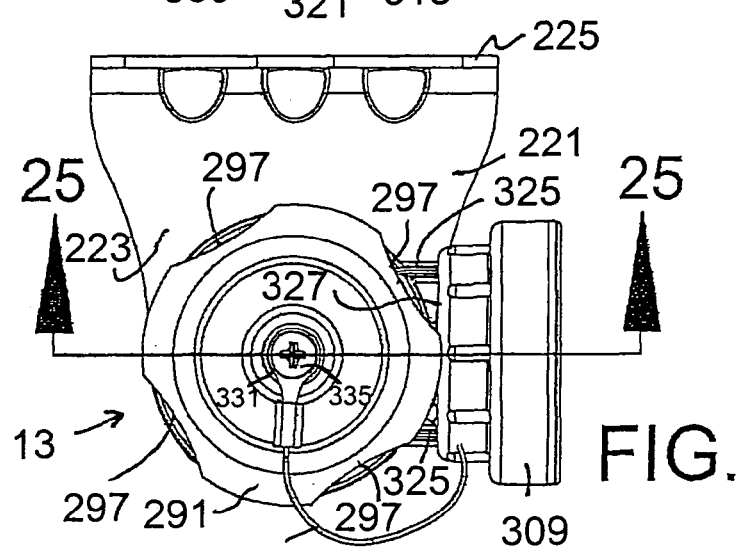
FIG. 24 is a top plan view of the interface 13, the mounting bracket 221, and the end cap 291 shown in FIG. 23.
Figure 26:
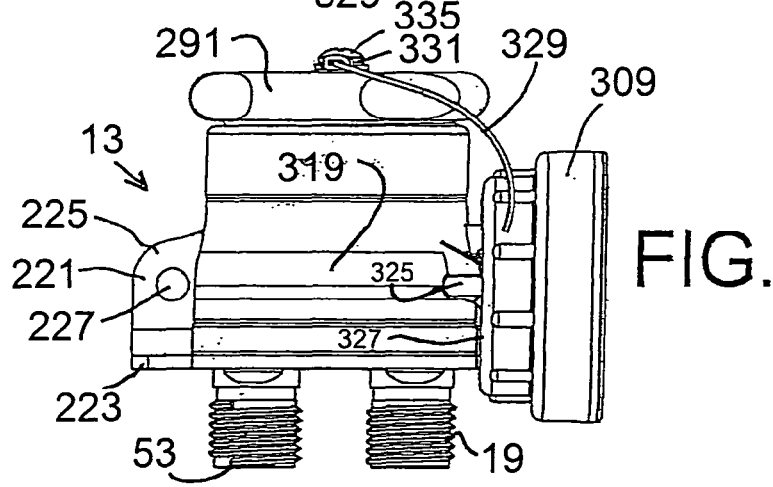
FIG. 26 is a view in front elevation of the interface 13, the mounting bracket 221, and the end cap 291 shown in FIG. 23.

Referring to FIGS. 2, 18, and 19, when the pressure vessel 15 is positioned above the interface 13 as shown in FIG. 2, with the pressure vessel 15 oriented neck-side down when connected to the interface 13, preferably, the pressure vessel 15 is provided with an automatic venting device 239 for venting air and breaking any unwanted vacuum.

To form the automatic venting device 239 in the pressure vessel 15, a third passageway 241 is provided in the pressure vessel 15 that extends completely through the bottom wall 169 of its bowl 167, and the automatic venting device 239 is positioned in the passageway 241. The automatic venting device 239 includes a vent sleeve 143 positioned in a chamber 243 formed along the third passageway 241. The vent sleeve 143 of the automatic venting device 239 has a cylindrical wall 147 having an inwardly extending ledge 149 formed at the downstream end portion of the vent sleeve 143, and (as only illustrated in FIG. 19) optionally a plurality of cutouts 151 (two being used in the vent sleeve 143 illustrated in FIG. 19) formed in the wall 147 extending from the downstream end portion of the vent sleeve 143 toward the upstream end portion of the vent sleeve 143. The ledge 149 of the vent sleeve 143 has an upstream end portion 149a and a downstream end portion 149b, and each such end portion 149a and 149b preferably is chamfered. A seal member 153, such as an o-ring or x-ring or quad seal, is positioned immediately downstream of the downstream end portion 149b of the ledge 149 and is blocked by the downstream end portion 149b of the ledge 149 from falling upstream into the chamber 243. A vent seal 245 sits over and against the seal member 153, the vent seal 245 having a recess 247 that receives the downstream portion of the seal member 153 and a central opening 245a extending through the vent seal 245 through which air from the third passageway 241 vents. The vent seal 245 preferably is provided with tabs 246 which are received by recesses 248 formed in the annular ridge 257 formed in the bowl 167 of the pressure vessel 15. A ball 155 preferably having a density less than the density of the fluid (e.g., if water is the fluid, a preferred specific gravity for the ball 155 is about 0.97) is positioned in the vent sleeve 143 and permits venting of air and breaking of any unwanted vacuum until the fluid pushes the ball 155 into engagement with the seal member 153 creating a seal between the ball 155 and the seal member 153 and the seal member 153 and the vent seal 245, thereby closing the third passageway 241.

The diameter of the third passageway 241 at the chamber 243 and the diameters of the cylindrical vent sleeve 143 and the ball 155 of the automatic venting device 239 are greater than the diameter of the third passageway 241 upstream of the chamber 243.

A screen 156, positioned in the chamber 243 upstream of the vent sleeve 143 of the automatic venting device 239, and a screen 152, positioned in a recess 249 formed in the downstream side end portion of the vent seal 245 and held therein by a vent cap 251 positioned thereover, are provided to reject possible interfering debris or particulates.

An o-ring 253 sits around an annular ridge 255 formed in the downstream side of the vent seal 245 to seal between the vent seal 245 and the annular ridge 257 formed in the bowl 167 of the pressure vessel 15 that defines the outlet port 259 of the third passageway 241.

The vent cap 251, which has a central opening 251a extending therethrough which air from the third passageway 241 vents, is secured over the annular ridge 257 securing the screen 152 in the recess 249 of the vent seal 245, as well as securing the automatic venting device 239 in place in the third passageway 241.

Referring to FIGS. 2, 6, and 20 to 29, preferably, a mounting bracket 221 is provided for mounting the interface 13 in place where it is desired to be used. The mounting bracket 221 preferably has a plate 223 that connects to the interface 13, and a flange portion 225 extending at a right angle from the end portion of the plate 223 having holes 227 extending therethrough that receive screws, threaded bolts, or the like for mounting the bracket 221 to the place where it is desired to use the interface 13. In the embodiment of the invention shown in the drawings, the plate 223 has openings 228 through which threaded bolts 229 are inserted into threaded bores 231 in the interface 13 to secure the plate 223 to the interface 13.

Preferably, the inlet port 19 to the first passageway 17 of the interface 13 comprises a hollow cylinder-shaped inlet port member 233 that is removeably mounted on the interface 13 at the inlet end portion of the first passageway 17 of the interface 13, and the outlet port 53 of the second passageway 51 of the interface 13 comprises a hollow cylinder-shaped outlet port member 234 that is removably mounted on the interface 13 at the outlet end portion of the second passageway 51 of the interface 13. After the pin holder 87 (with the pin 79 positioned therein) is inserted in the inlet end portion of the first passageway 17 of the interface 13 and positioned against the annular ledge 89, and after the valve 21 is inserted into the portion of the first passageway 17 in the inlet port member 233 and positioned against the annular ledge 22, the end portion 237 of the inlet port member 233, along with an o-ring 236 surrounding the end portion 237 of the inlet part member 233, are inserted into the interface 13 at the inlet end portion of the first passageway 17 to abut against an annular ledge 501. Likewise, the end portion 240 of the outlet port member 234 along with an o-ring 238 surrounding the end portion 240 of the outlet port member 234, are inserted into the interface 13 at the outlet end portion of the second passageway 51 to abut against an annular ledge 244. Then, the inlet port member 233 and the outlet port member 234 are held in place on the interface 13 by positioning the plate 223 such that the inlet port member 233 extends through opening 247 in the plate 223 and the outlet port member 234 extends through opening 249 in the plate 223, and the plate 223 sandwiches an outwardly extending annular flange 235 formed on the end portion 237 of the inlet port member 233 and an outwardly extending annular flange 251 formed on the end portion 240 of the outlet port member 234 between the end portion 239 of interface 13 at recesses 242 sized to receive flanges 235 and 251 and the plate 223 of the mounting bracket 221, the threaded bolts 229 extending through the plate 223 into the threaded bores 231 in the interface 13 holding the plate 223 in place on the interface 13, resulting in the inlet port member 233 and the outlet port member 234 being sealingly mounted onto the interface 13, the o-ring 236 sealing between the inlet port member 233 and the interface 13 and the o-ring 238 sealing between the outlet port member 234 and the interface 13.

The inlet port member 233 and the outlet port member 234 preferably are interchangeable with a variety of other port members, which may have, for instance, different lengths or connection means or internal bore sizes, to accommodate end user requirements.

Also, since the inlet port member 233 and the outlet port member 234 are removably mounted on the interface 13, they may be removed from the interface 13 by merely unscrewing the threaded bolts 229 from the interface 13 so that the plate 223 of the mounting bracket 221, the inlet port member 233, and the outlet port member 234 may be removed. The valve 21, the pin holder 87, the pin 79, and o-rings 236 and 238 may be easily cleaned or repaired or replaced after they are slid from the passageway 17 of the interface 13 after the plate 223 and port member 233 have been removed off the interface 13. After cleaning or repairing the valve 21, the pin holder 87, the pin 79, and the o-rings 236 and 238, the pin holder 87 with the pin 79 positioned therein may be re-inserted into the first passageway 17 in the interface 13 and the valve 21 may be re-inserted into the port member 233 of the interface 13, and then the port members 233 and 234 (with the o-rings 236 and 238 respectively mounted thereon) may again be removably mounted on the interface 13 using the plate 223 to secure the port members 233 and 234 in place. If it is desired to replace a used valve 21 with a new valve 21, or to replace a used pin holder 87 and/or a used pin 79 with a new pin holder 87 and/or a new pin 79, or to replace used o-rings 236 and 238 with new a-rings 236 and 238, a new valve 21 and/or a new pin holder 87 and/or a new pin 79 and/or new o-rings 236 and 238 may be used rather than the cleaned or repaired valve 21, the cleaned or repaired pin holder 87, the cleaned or repaired pin 79, and the cleaned or repaired O-rings 236 and 238.

As shown in FIGS. 3, 4, 10, and 11, the interface 13 also has a third passageway 401 extending from the second passageway 51 downstream of the second valve 95 to the first passageway 17 downstream of first valve 21. A chamber 403 is formed along the third passageway 401, and a third valve 405 is positioned in the chamber 403. The third valve 405 preferably is a spring-loaded check valve (hereinafter referred to as "third check valve 405" or "valve 405", and preferably has the same structure as first check valve 21 and second check valve 95 and includes a valve housing 23 which contains a movable valve disk 33, as described above for the first check valve 21 and the second check valve 95. Like first check valve 21 and second check valve 95, a spring 40 is provided in the third check valve 405 to bias the valve 405 in a closed position. That is, the spring 40 of the valve 405 is provided to bias the valve disk 33 of valve 405 against the valve seat 31 of valve 405. Prior to securing the plate 223 onto the interface 13 as set out above, the third check valve 405 is inserted into the chamber 403 through an opening 407 formed in the interface 13, followed by a solid cylindrical disk 409, preferably made of a polymeric material, being inserted through the opening 407 into the chamber 403. The disk 409 has a bore 411 extending partially through it along its central axis for receiving the top end of the guide pin 37 of the third check valve 405 when the top end of the guide pin 37 extends beyond the guide pin holder 39 of the third check valve 405 when the third check valve 405 is in an open position. After the third check valve 405 and the disk 409 have been placed in the chamber 403, an o-ring 413 is placed in a groove 415 formed in the end portion 239 of the interface 13 and surrounding the opening 407, which provides a seal between the interface 13 and the plate 233 to seal the opening 407, when the plate 223 is secured onto the interface 13 as set out above. Like the pin holder 87, the pin 79, and the first check valve 21, the third check valve 405, the disk 409, and the o-ring 413 may be removed from the interface 13 for cleaning, repair, or replacement by unscrewing the plate 223 from the interface 13, thereby permitting the third check valve 405 and the disk 409 to be slid from the chamber 403 through the opening 407 and permitting the o-ring 413 to be removed from the groove 415.

In use, the pressure vessel 15 may be connected to the interface 13 by rotating the pressure vessel 15 into the interface 13 such that, in accordance with the invention, the neck 59 of the pressure vessel 15 is received in the recess 241 of the interface 13 and held therein by the engagement of the threads 57 being screwed into the threads 61 formed on the interface 13, with the end portion 191 of the tube 187 sealingly received in the inlet port 55 of the second passageway 51 of the interface 13 due to the o-rings 201 and 202 sealing between the wall of the inlet port 55 and the tube 187, and with a portion of the first end portion 73 of the neck 59 of the pressure vessel 15 pushing the pin 79 to cause the pin 79 to push the disk 33 of the first valve 21 off the valve seat 31 to open the first valve 21 to permit the flow of fluid through the first valve 21 and passageway 17, and with the end portion 112 of the inlet port 55 of the interface 13 pushing the ring 113 to cause the at least one projection or leg 117 to push the disk 209 out of contact with the neck wall 59a of the pressure vessel 15 to place and maintain the flapper valve 211 in the open position while the pressure vessel 15 is connected to the interface 13.

As illustrated in FIGS. 29 and 2, after flowing through the first passageway 17 of the interface 13, the fluid (e.g., water) exits the outlet port 41 of the first passageway 17 of the interface 13 and enters the first passageway 45 of the pressure vessel 15 though the inlet port 43, and then moves along the first passageway 45 to the outside of the matrix 177 and then through the matrix 177 to the channel 179 of the second passageway 47 formed in the pressure vessel 15. Next, the fluid flows from the channel 179 into and through the passageway 193 formed in the tube 187, and exits the pressure vessel 15 from the outlet port 49 formed at the end of the tube 187 and enters into the second passageway 51 of the interface 13 through the inlet port 55. Then, the fluid pushes the movable disk 33 of the second check valve 95 off the valve seat 31 of the second check valve 95 and moves it in a downstream direction away from the valve seat 31 of the second valve 95 to permit fluid to flow through the second valve 95 and through the second passageway 51 of the interface 13 to a fluid receiving line connected to the outlet port 53.

Unscrewing the pressure vessel 15 off the interface 13 discontinues flow of fluid through the first passageway 17 since the pin 79 is no longer being pushed by the pressure vessel 15 to lift the valve disk 33 of the valve 21 off the valve seat 31 of the valve 21 and the fluid flowing into the first passageway 17 pushes the valve disk 33 of the valve 21 back onto the valve seat 31 of the valve 21 to close valve 21.

Backflow of fluid from the second passageway 51 of the interface 13 to the inlet port 55 at the inlet portion of the second passageway 51 of the interface 13 (and into the outlet port 49 of the pressure vessel 15 if the pressure vessel 15 is secured onto the interface 13) is blocked by the check valve 95 since such backflow pushes the valve disk 33 of the valve 95 against the valve seat 31 of the valve 95 to close the valve 95.

If water boiler expansion pressure builds up to a dangerous level due to a water boiler provided along the water distribution lines downstream of our apparatus 11 overheating, our inventive interface 13 provides water boiler expansion pressure relief by permitting the water boiler expansion pressure to be directed backwards along the water transmission lines and back towards the water supply source (e.g., a water supply tank) without being blocked by the interface 13. As illustrated in FIGS. 3 and 4, such water boiler expansion pressure moving into the second passageway 51 of the interface 13 via the outlet port 53, and in combination with the spring 40 of the second check valve 95, pushes the movable disk 33 of the second check valve 95 onto the valve seat 31 of the second check valve 95, thereby causing the second check valve 95 to close preventing backflow of water past the second check valve 95 and into the filtration/purification canister 14. Such water boiler expansion pressure expands into the third passageway 401 of the interface 13 from the second passageway 51 of the interface 13 and pushes the movable disk 33 of the third check valve 405 away from the valve seat 31 of the third check valve 405 thereby opening the third check valve 405, permitting the water boiler expansion pressure to move past the third check valve 405 and into the first passageway 17 of the interface, then past the first check valve 21 which is in an opened position due to the pin 79 pushing the movable disk 33 of the first check valve 21 away from the valve seat 31 of the first check valve 21, then into the water transmission line via the inlet port 19 at the entrance to the first passageway 17, and then back along the water transmission line upstream of the interface 13 toward the water supply source (e.g., a water supply tank) of the water distribution system. Such dangerous level water boiler expansion pressure overcomes the force placed on the disk 33 of the second check valve 95 by water from the canister 14, and the force placed on the disk 33 of the third check valve 405 by the spring 40 of the third check valve 405 and the force of water moving directly into the third passageway 401 from the first passageway 17 pushing the movable disk 33 of the third check valve 405 into a closed position against the valve seat 31 of the third check valve 405, permitting the water boiler expansion pressure to move through the interface 13 back towards the water supply source.

The inventive interface 13 provides for water boiler expansion pressure relief by permitting the water boiler expansion pressure to be directed backwards along the water transmission lines past the interface 13 and back towards the water supply source (e.g., a water supply tank) without being blocked by the interface 13, and without causing water to backflow through the canister 14 thereby preventing any water contaminated from biofilm formed on the transmission lines downstream of the canister 14 from backflowing into the canister 14 and contaminating the filtered and/or conditioned and/or purified side of the matrix 177 and thereby cause the water exiting the outlet port 43 of the canister 14 to be contaminated.

Figure 25:
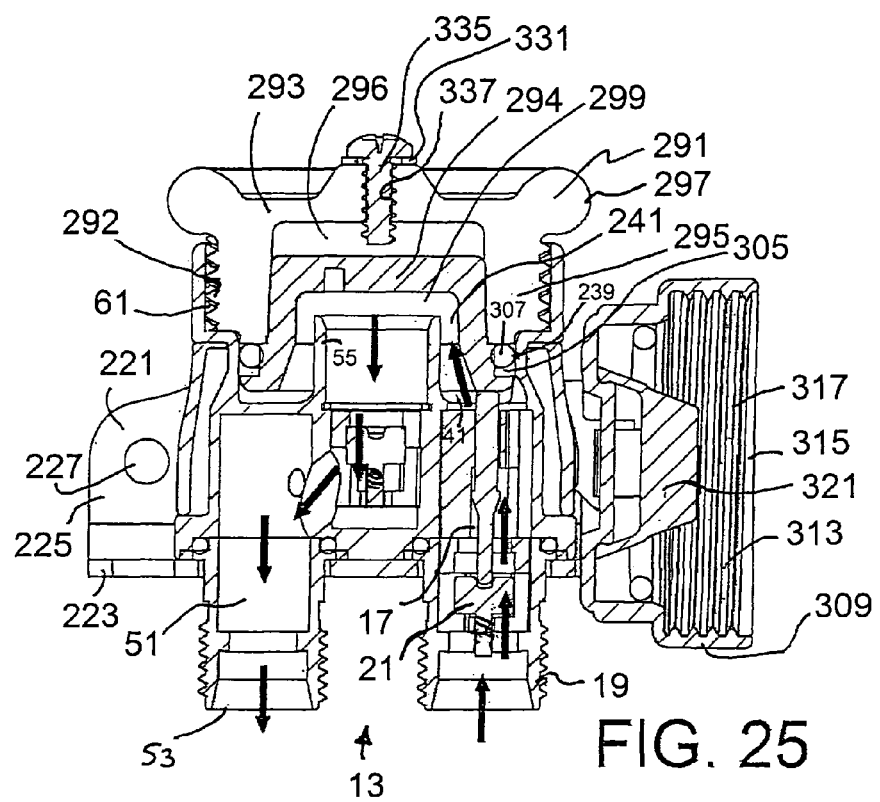
FIG. 25 is a view in cross-section taken along the lines and arrows 25-25 shown in FIG. 24.
Figure 27:
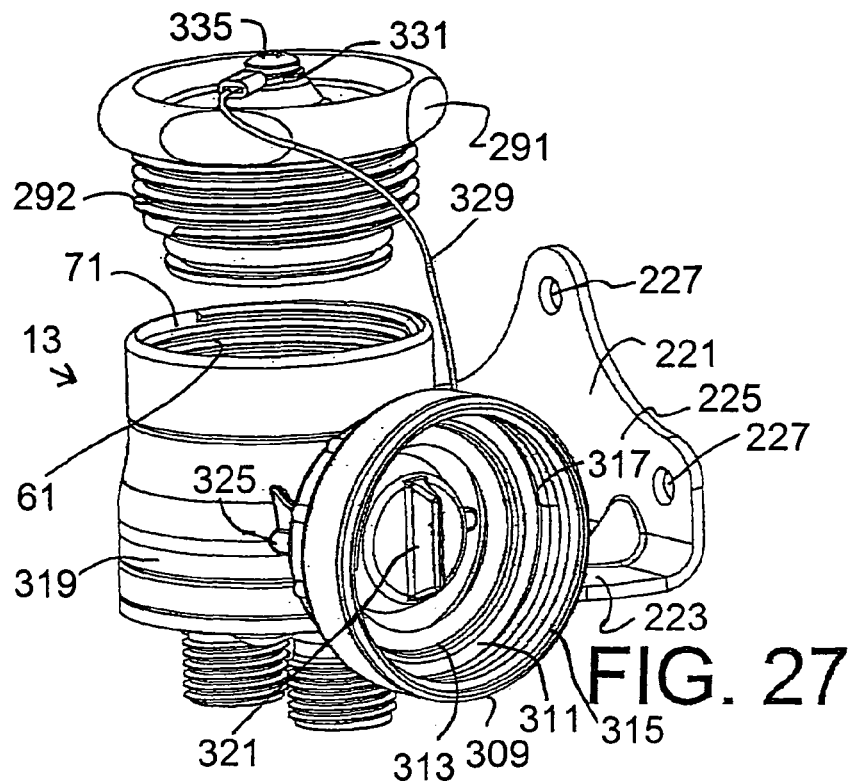
FIGS. 27 and 28 are different views in perspective showing the interface 13 with the mounting bracket 221 and the end cap holder 309 mounted thereon, and the end cap 291 being shown about to be screwed into the recess 241 of the interface 13.
Figure 28:
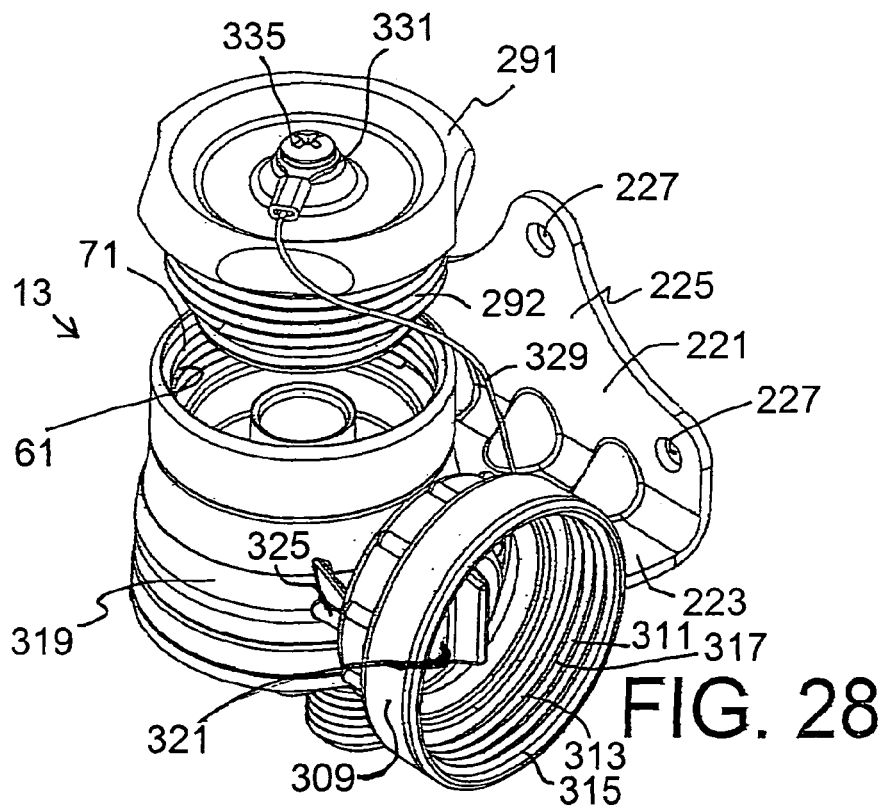

Referring to FIGS. 5, 6 and 20 to 28, preferably, an end cap 291, preferably made of a polymer, is provided, to be secured onto the interface 13 when a pressure vessel 15 is not secured to the interface 13 to maintain a sanitary condition inside the interface 13 by blocking dirt, debris, or other contaminants from having easy access to the second end portion 71 of the interface 13, including the outlet port 41 from the first passageway 17 of the interface 13 and the inlet port 55 to the second passageway 51 of the interface 13. As shown in FIG. 25, preferably, the end cap 291 has a body 293 having a neck portion 295 for connecting the end cap 291 onto the interface 13 and having four indents 297 formed therein to facilitate gripping of the end cap 291 when rotating the end cap 291 into position on the interface 13 and when rotating end cap 291 off of the interface 13. Like the neck 59 of the pressure vessel 15, the neck portion 295 has threads 292 formed on the outer surface of the neck portion 295 that engage matching threads 61 formed on the interface 13 when the end cap 291 is screwed onto the interface 13 in place of a pressure vessel 15. The end cap 291 also includes a liner 294 (optionally made from or coated with an antimicrobial material) that is spin welded into place into a recess 296 formed in the body 293. An annular groove 305 is provided around the end cap 291, and an o-ring 307 sits in the annular groove 305 for sealing between the end cap 291 and the second end portion 239 of the interface 13 at the recess 241. A further application of the end cap 291, when screwed into the recess 241 to form a sealed connection therebetween, is to direct fluid that flows from the outlet port 41 of the first passageway 17 of the interface 13 into a portion 299 of the recess 241 between the outlet port 41 of the first passageway 17 of the interface 13 and the end cap 291 into the inlet port 55 of the second passageway 51 of the interface 13. If a canister (e.g., pressure vessels 15 containing filtration and/or conditioning and/or purification means such as a cartridge 16, loose media, or the like) becomes clogged during use of the apparatus 11 and there are no replacement canisters (e.g., pressure vessels 15 each containing filtration and/or conditioning and/or purification means such as a cartridge 16, loose media, or the like) available, the clogged canister may be removed from service (that is, removed from interface 13) and replaced with the end cap 291 so that fluid may flow through the fluid distribution system without being blocked at the interface 13 positioned along the fluid distribution system.

Preferably, an end cap holder 309 is provided for storing the end cap 291 when the end cap 291 is not in use. Preferably, the end cap holder 309 has a storage compartment 311 defined at least in part by a recess or tube-shaped portion 313 formed in the end cap holder 309 having an open end 315 in through which the end cap 291 may be inserted into the storage compartment 311. The tube-shaped portion 313 has an inside surface onto which is formed an internal threading 317 that matches and is connectably engageable with the threading 292 formed on the end cap 291 so that the end cap 291 may be secured in the storage compartment 311 of the end cap holder 309 when the end cap 291 is not in use by screwing the end cap 291 into the storage compartment 311. Preferably, the end cap holder 309 is provided with a snap ring 319 which may be extended around the interface 13 and closed to secure the end cap holder 309 to the interface 13. Preferably, a capture ring interlock 321 is provided inside the storage compartment 311 to engage flanges 323 of the snap ring 319 to prevent the flange 323 from moving from one another, thereby preventing the snap ring 319 from opening after it has been secured onto the interface 13. Further, preferably, a pair of projections 325 are provided on the snap ring 319. The projections 325 project into holes formed in the bottom wall 327 of the end cap holder 309 to assist in preventing the snap ring 319 from being removed from the interface 13. Accordingly, the end cap 291 may be stored when not in use in close proximity to the interface 13. Preferably, a cable 329, having a first looped portion 331 secured at the first end of the cable 329 and a second looped portion 333 secured at the second end of the cable 329, is also provided to insure that the end cap 291 is not inadvertently misplaced. The threaded portion of a threaded bolt 335 is placed through the first looped portion 331 of the cable 329 and then the threaded bolt 335 is secured into a threaded bore 337 formed in the end cap 291 to secure the first end portion of the cable 329 to the end cap 291, and the threaded portion of one of the threaded bolts 229 is placed through the second looped portion 333 of the cable 329 and then that threaded bolt 229 is extended through one of the openings 228 in the plate 223 and screwed into an aligned threaded bore 231 in the interface 13 to secure the second end portion of the cable 329 to the interface 13.

When it is desired to sanitize the fluid distribution system (e.g., an aircraft potable water distribution system) that the interface 13 is connected to, an end cap 291 may be screwed into the recess 241 of each interface 13 after the pressure vessel 15 has been removed from the interface 13. This permits sanitizing fluid used to sanitize the fluid distribution system to flow in the fluid distribution system along fluid transmission lines to each interface 13, through each interface 13, and then back to the fluid transmission lines of the fluid distribution system downstream from each interface 13.

In a preferred embodiment of the invention relating to providing filtered and/or conditioned and/or purified water, especially purified water, from a potable water distribution system of, for example, an aircraft, interfaces 13 are installed locally at various cabin crew readily accessible service locations (service points) within galleys and lavatories of the aircraft, and the potable water distribution system is connected to each of the interfaces 13. Preferably, the interfaces 13 are positioned at or near where the water that is filtered and/or conditioned and/or purified in the pressure vessels 15 attached to the interfaces 13 is discharged from the potable water distribution system. With this arrangement, the interface 13 may be easily accessed to install filtration/purification canisters (e.g., pressure vessels 15 each containing filtration/conditioning/purification means such as a cartridge 16, loose media, or the like) onto the interfaces 13, and to remove filtration/purification canisters (e.g., pressure vessels 15 each containing filtration/conditioning/purification means such as a cartridge 16, loose media, or the like) that have been used and install fresh canisters (e.g., pressure vessels 15 each containing filtration/conditioning/purification means such as a cartridge 16, loose media, or the like) in their place. Also, in contrast to prior art aircraft potable water distribution systems where water is passed through a cluster of more remote or centralized filters/purifiers to remove chlorine, foul tastes, and odors, and sent along branches or legs of the potable water distribution system to be discharged from the branches or legs for use, possibly becoming contaminated from bacteria growing in the branches or legs, under this preferred embodiment of our invention, the water is filtered and/or conditioned and/or purified at or very near the point where it is discharged from the interface 13 and actually used, thereby reducing the chances of contamination of the water after it has been filtered and/or conditioned and/or purified due to bacteria growing in the branches or legs or other possible contamination between the remote or centralized filters/purifiers and the point of discharge from the potable water distribution system.

Under the invention, water may be filtered and/or conditioned and/or purified at the point of use of the filtered and/or conditioned and/or purified water and at the time of use of the filtered and/or conditioned and/or purified water, significantly reducing chances of the filtered and/or conditioned and/or purified water becoming contaminated before it is used.

When it is desired to drain the fluid distribution lines of a fluid distribution system equipped with at least one apparatus 11 of the invention oriented with the pressure vessel 15 positioned above the interface 13 as shown in FIG. 2, the fluid in each pressure vessel 15 may be drained with the rest of the fluid in the fluid distribution system since fluid in each pressure vessel 15 may exit the pressure vessel 15 via not only the outlet port 49 of the pressure vessel 15 but also via the inlet port 43 of the pressure vessel 15 because the flapper valve 211 is in an open position when the pressure vessel 15 is connected to the interface 13. The fluid draining from the inlet port 43 of the pressure vessel 15 during the draining of the fluid distribution system may move past the first valve 21 (that is, back flow through the first valve 21) during draining of the fluid distribution system because the first valve 21 is held open by the actuating pin 79 since the pressure vessel 15 is positioned on the interface 13 during fluid draining of the fluid distribution system. Accordingly, when it is desired to drain the water distribution system in aircraft equipped with at least one apparatus 11 of the invention during periods of non-use (such as overnight) in cold climates, in accordance with the invention, the entire water distribution system including the pressure vessel(s) 15 may be drained without removing each pressure vessel 15 from each interface 13.

In addition to its applicability to aircraft potable water distribution systems, the invention may be applied in drinking water systems of recreational boats and yachts, commercial boats, recreational vehicles/caravans, residential homes, and water vending, cooling, warming and dispensing machines (such as those used in hospitals, schools, homes and factories). The invention also maybe applied to water systems in dental offices and laboratories.

The invention provides exceptional effectiveness (regarding water treatment results and cost effectiveness) and flexibility, and often weight reduction for aircraft and other uses with respect to providing filtered and/or conditioned and/or purified water. The apparatus 11 of the invention is easy to operate, requires little maintenance, and is dependable.

The apparatus 11 is very compact, light weight, long lasting, easily refurbished for extra-long service and embodies a slim-line design.

The filtration/purification canister 14 (e.g., pressure vessel 15 containing filtration/conditioning/purification means such as a cartridge 16, loose media, or the like) may be provided with a light-weight composite construction. Due to its size/structure, the filtration/purification canister 14 holds approximately 50% less unusable "transition water" (water retained in the canister 14 necessary for the canister 14 to function optimally) than prior art filters/purifiers, thereby making more of the water in the water distribution system available for use.

The invention provides point of use and time of use advantages. For instance, in an aircraft, the invention provides a potable water distribution system having interfaces 13 installed locally at various cabin crew readily accessible service locations or service points within galleys and lavatories of the aircraft, preferably at or near where water that is filtered and/or conditioned and/or purified is discharged from the potable water distribution system.

The invention provides for positioning the apparatus 11 of the invention in convenient, easily accessible locations. For instance, with respect to an aircraft water distribution system, in contrast to the prior art, the apparatuses 11 of the invention are provided at various cabin crew readily accessible service locations in the galleys and lavatories of the aircraft at or near where water that is to be filtered and/or conditioned and/or purified is to be discharged from the potable water distribution system.

The cartridge 16 may be obtained from General Ecology, Inc., of Exton, Pa., and may be configured to provide what the user desires for optimum service related to the application. For instance, the cartridge 16 may be configured to provide microbiological purification as independently certified to now current EPA Protocol for Microbiological Purifiers, or to provide scale control and taste and odor removal, or to provide taste and odor removal along with larger pathogen removal, etc.

In accordance with the invention, antimicrobial surfaces may be provided to various components of the apparatus 11, such as to the tube 187, to assist in preventing backwards directed growth of bacteria, mildew and fungus into the canister, especially during short term periods of open non-use.

Backflow prevention provided in the interface 13 by valve 95 prevents spillage from the interface 13 when the canister is removed from the interface 13. Further, this backflow prevention by valve 95 prevents reverse water flow into the purified/filtered water side of the canister.

The valve 21, which preferably is made from a flexible elastomeric material, helps prevent backflow from the canister, thereby limiting spillage when the canister is removed from the interface 13.

Due to the construction of the interface 13, the interface 13 may be easily disassembled and inexpensively refurbished for exceptionally long life using readily available hand tools, if necessary, with common replacement components to replace items such as o-rings, check valves, etc. Accordingly, the interface 13 of the invention is long lasting.

In a preferred embodiment of the invention, the pressure vessel 15 may be provided with an automatically venting feature for venting air and breaking vacuum in the pressure vessel 15.

In addition to being capable of being mounted such that the canister is positioned on the interface 13 above the interface 13, the interface 13 may be mounted in an inverted position such that the outlet port 53 of the interface 13 points upwardly.

The apparatus 11 of the invention provides for exceptionally quick and easy one-handed canister changes by non-technical, untrained personnel.

Canisters 14 (e.g., pressure vessels 15 each containing filtration/conditioning/purification means such as a cartridge 16, loose media, or the like) are disposable and can be completely incinerated. The pressure vessel 15 of the canister provides a barrier against contact with the internal, contaminated section of a used canister when it is being removed from the interface and discarded.

The apparatus 11 is provided with an automatic valving features, which discontinues flow from the outlet port 41 of the interface 13 when the canister 14 is disconnected from the interface 13, and that activates flow of fluid (e.g., water) through the interface 13 into the canister 14 when the canister 14 is connected to the interface 13.

The canisters 14 are protected from breaking if freezing occurs by the compressible tube 213. Accordingly, draining of the canisters is not necessary if freezing temperatures exist. Further, the canisters 14 function normally after thawing.

The canisters 14 are heat resistant up to a survival temperature of 185° F. for two hours.

Canisters 14 (e.g., pressure vessels 15 each containing filtration/conditioning/purification means such as a cartridge 16, loose media, or the like) of the invention are ready to use immediately after being installed with normally minimal purge of water to expel air and small amounts of residual manufacturing materials.

The end cap 291, an optional feature, is available to protect the water distribution system from contaminants and debris when a canister is not installed on an interface 13. The end cap 291, when screwed into recess 241, permits fluid to flow through the interface 13 that it is connected to, thereby allowing fluid to flow to the fluid distribution line of the fluid distribution system downstream of the interface 13.

The interface 13 may be installed with the interface 13 being positioned above or below the canister 14.

Because the invention provides for easy, quick, and cost effective replacement of the filtration/purification canisters 14 (e.g., pressure vessels 15 each containing a cartridge 16) onto the interfaces 13, preferably, the filtration/purification canisters 14 (e.g., pressure vessels 15 each containing a cartridge 16) may be removed from the interfaces 13 and replaced with new filtration/purification canisters 14 (e.g., pressure vessels 15 each containing a cartridge 16) before each flight of the aircraft or before the first flight of the day for the aircraft, to avoid using a contaminated or spent filtration/purification canisters 14 (e.g., pressure vessels 15 each containing a cartridge 16). In contrast, due to the cost and difficulty of changing filtration/purification canisters in prior art systems, changes of filtration/purification canisters 14 in prior art systems are not typically done more often than every 90 days or so by a maintenance crew.

The invention claimed is:

1. An apparatus for connecting a pressure vessel containing means for filtering and/or conditioning and/or purifying water to a water distribution system and for providing water boiler expansion pressure relief to avoid a risk of scalding hot water flowing from a faucet positioned along the water distribution system, comprising a body having a first passageway extending through it, the body having an inlet port formed at an inlet end portion of the first passageway of the body, the body having an outlet port formed at an outlet end portion of the first passageway of the body, and the body being adapted to be connected to a water transmission line for distributing water from a water supply tank to a pressure vessel when the pressure vessel is connected to the body, the pressure vessel containing means for filtering and/or conditioning and/or purifying water, the body being adapted to be connected to the water transmission line at the inlet port formed at the inlet end portion of the first passageway of the body, and the body being adapted to be connected to an inlet port of the pressure vessel at the outlet port formed at the outlet end portion of the first passageway of the body, the body having a second passageway extending through it, the body having an inlet port formed at an inlet end portion of the second passageway of the body, the body having an outlet port formed at an outlet end portion of the second passageway of the body, and the body being adapted to be connected to a water receiving line for receiving water that has been filtered and/or conditioned and/or purified in the pressure vessel when the pressure vessel is connected to the body, the body being adapted to be connected to an outlet port of the pressure vessel at the inlet port formed at the inlet end portion of the second passageway of the body, the body being adapted to be connected to the water receiving line at the outlet port formed at the outlet end portion of the second passageway of the body, and the water receiving line being adapted to be connected to a water boiler, a first valve positioned in the first passageway of the body for blocking flow of fluid through the first passageway from the inlet port of the first passageway of the body when the valve is closed, a second valve positioned in the second passageway of the body for blocking backflow of water from the second passageway of the body to the inlet port at the inlet end portion of the second passageway of the body when the pressure vessel is not connected to the interface, the body having a third passageway extending from the second passageway downstream of the second valve to the first passageway, and third valve means positioned in the third passageway of the body for blocking flow of water through the third passageway from the first passageway to the second passageway and, if water boiler expansion pressure builds up to a dangerous level due to a water boiler connected to the water receiving line overheating, for permitting such water boiler expansion pressure that moves into the third passageway from the second passageway to open the third valve means and to be directed from the second passageway downstream of the second valve via the third passageway to the first passageway and then from the inlet port formed at the inlet end portion of the first passageway of the body to the water transmission line and back towards the water supply tank, the third valve means being a check valve.

2. The apparatus of claim 1, the first valve including a valve housing, the valve housing having an annular ring having an annular inner wall surface, the annular inner wall surface having an annular ledge formed thereon creating a valve seat, and a movable valve disk contained within the valve housing that closes the first valve when the valve disk rests against the valve seat and that permits flow of water through the first valve when the valve disk is not resting against the valve seat, the valve disk having a guide pin formed on and extending upstream from its upstream face that is engaged by and slides in a guide pin holder to keep motion of the valve disk on a line that permits proper seating of the valve disk on the valve seat when the first valve is closed, the guide pin holder being positioned upstream of the annular ring.

3. The apparatus of claim 2, further including
actuating means for automatically opening the first valve in the body when the pressure vessel is connected to the interface, and
the actuating means including a pin positioned in the first passageway of the body between the valve disk and the outlet port at the outlet end portion of the first passageway of the body, the pin having a first end portion that engages the valve disc, and the pin having a second end portion,
wherein when an end portion of the pressure vessel that engages second end portion of the pin when the pressure vessel is connected to the interface, the pin pushes against and lifts the valve disk of the first valve off the valve seat of the first valve to open the first valve.

4. The apparatus of claim 1,
the second valve including
a valve housing, the valve housing having an annular ring having an annular inner wall surface, the annular inner wall surface having an annular ledge formed thereon creating a valve seat, and
a movable valve disk contained in the valve housing that closes the second valve when the valve disk rests against the valve seat and that permits flow of water through the second valve when the valve disk is not resting against the valve seat, the valve disk having a guide pin formed on and extending downstream from its downstream face that is engaged by and slides in a guide pin holder to keep motion of the valve disk on a line that permits proper seating of the valve disk on the valve seat when the second valve is closed, the guide pin holder being positioned downstream of the annular ring of the second valve.

5. The apparatus of claim 1,
the third valve means including
a valve housing, the valve housing having an annular ring having an annular inner wall surface, the annular inner wall surface having an annular ledge formed thereon creating a valve seat, and
a movable valve disk contained in the valve housing that closes the third valve means when the valve disk rests against the valve seat, the valve disk having a guide pin formed on and extending downstream from its downstream face that is engaged by and slides in a guide pin holder to keep motion of the valve disk on a line that permits proper seating of the valve disk on the valve seat when the third valve means is closed, the third valve means being oriented in the third passageway of the body such that the valve disk of the third valve means is oriented to be pushed away from the valve seat of the third valve means by water boiler expansion pressure received in the third passageway of the body from the second passageway of the body to open the third valve means.

6. An apparatus for connecting a pressure vessel containing means for filtering and/or conditioning and/or purifying water to a water distribution system and for providing water boiler expansion pressure relief to avoid a risk of scalding hot water flowing from a faucet positioned along the water distribution system and injuring a person who opens the faucet if a water boiler connected to the water distribution system overheats, comprising
a body having a first passageway extending through it, the body having an inlet port formed at an inlet end portion of the first passageway of the body, the body having an outlet port formed at an outlet end portion of the first passageway of the body, and the body being adapted to be connected to a water transmission line for distributing water from a water supply tank to a pressure vessel when the pressure vessel is connected to the body, the pressure vessel containing means for filtering and/or conditioning and/or purifying water, the body being adapted to be connected to the water transmission line at the inlet port formed at the inlet end portion of the first passageway of the body, and the body being adapted to be connected to an inlet port of the pressure vessel at the outlet port formed at the outlet end portion of the first passageway of the body,
the body having a second passageway extending through it, the body having an inlet port formed at an inlet end portion of the second passageway of the body, the body having an outlet port formed at an outlet end portion of the second passageway of the body, and the body being adapted to be connected to a water receiving line for receiving water that has been filtered and/or conditioned and/or purified in the pressure vessel when the pressure vessel is connected to the body, the body being adapted to be connected to an outlet port of the pressure vessel at the inlet port formed at the inlet end portion of the second passageway of the body, the body being adapted to be connected to the water receiving line at the outlet port formed at the outlet end portion of the second passageway of the body, and the water receiving line being adapted to be connected to a water boiler,
a first valve positioned in the first passageway of the body for blocking flow of water through the first passageway from the inlet port of the first passageway of the body when the valve is closed,
a second valve positioned in the second passageway of the body for blocking backflow of water from the second passageway of the body to the inlet port at the inlet portion of the second passageway of the body when the pressure vessel is not connected to the body,
the body having a third passageway extending from the second passageway downstream of the second valve to the first passageway, and
a third valve positioned in the third passageway for blocking flow of water through the third passageway from the first passageway to the second passageway and, if water boiler expansion pressure builds up to a dangerous level due to a water boiler connected to the water receiving line overheating, for permitting such water boiler expansion pressure that moves into the third passageway from the second passageway to open the third valve and to be directed from the second passageway downstream of the second valve via the third passageway to the first passageway and then from the inlet port formed at the inlet end portion of the first passageway of the body to the water transmission line and back towards the water supply tank, the third valve being a check valve.

7. The apparatus of claim 1, further including
means formed on the body for connecting the pressure vessel to the interface, when desired, and for disconnecting the pressure vessel from the interface, when desired.

8. The apparatus of claim 6, further including
means formed on the body for connecting the pressure vessel to the interface, when desired, and for disconnecting the pressure vessel from the interface, when desired.

9. The apparatus of claim 1,
the third passageway extending to the first passageway downstream of the first valve.

10. The apparatus of claim 6,
the third passageway extending to the first passageway downstream of the first valve.

\* \* \* \* \*